United States Patent
Hu et al.

(10) Patent No.: US 12,316,845 B2
(45) Date of Patent: May 27, 2025

(54) CODING EFFICIENCY OF BOUNDARY COORDINATES OF SRCC SCAN REGION

(71) Applicant: Tencent Technology (Shenzhen) Company Limited, Guangdong (CN)

(72) Inventors: Ye Hu, Shenzhen (CN); Liqiang Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 275 days.

(21) Appl. No.: 17/978,092

(22) Filed: Oct. 31, 2022

(65) Prior Publication Data
US 2023/0061939 A1     Mar. 2, 2023

Related U.S. Application Data

(63) Continuation of application No. PCT/CN2021/131617, filed on Nov. 19, 2021.

(30) Foreign Application Priority Data

Feb. 22, 2021   (CN) .......................... 202110199310.0

(51) Int. Cl.
   H04N 19/129     (2014.01)
   H04N 19/13      (2014.01)
   (Continued)

(52) U.S. Cl.
   CPC ........... H04N 19/129 (2014.11); H04N 19/13 (2014.11); H04N 19/167 (2014.11);
   (Continued)

(58) Field of Classification Search
   CPC .... H04N 19/129; H04N 19/176; H04N 19/18; H04N 2201/04796; H04N 19/167;
   (Continued)

(56) References Cited

U.S. PATENT DOCUMENTS

| | | | |
|---|---|---|---|
| 2018/0205972 A1* | 7/2018 | Piao | ........................ H04N 19/13 |
| 2018/0288440 A1* | 10/2018 | Chao | ..................... H04N 19/132 |

(Continued)

FOREIGN PATENT DOCUMENTS

| | | |
|---|---|---|
| CN | 108293139 A | 7/2018 |
| CN | 111727606 A | 9/2020 |
| WO | 2019045538 A1 | 3/2019 |

OTHER PUBLICATIONS

International Search Report and Written Opinion issued in International Application No. PCT/CN2021/131617, mailed Feb. 23, 2022, with English Translation, 8 pages.

*Primary Examiner* — Daniel Chang
(74) *Attorney, Agent, or Firm* — ArentFox Schiff LLP

(57) ABSTRACT

A video decoding method includes obtaining a size of a coding block of a video image frame, and decoding a bitstream of the coding block to obtain a value of a range variable associated with a SRCC scan region of the coding block. The range variable includes a width range variable and a height range variable. Each of the width range variable and the height range variable are obtained by comparing a prefix value to one or more predefined value intervals. The method further includes determining a horizontal coordinate of boundary coordinates of the SRCC scan region according to a difference between the width of the coding block and the width range variable and determining a vertical coordinate of the boundary coordinates of the SRCC scan region according to a difference between the height of the coding block and the height range variable.

20 Claims, 8 Drawing Sheets

(51) Int. Cl.
*H04N 19/167* (2014.01)
*H04N 19/172* (2014.01)
*H04N 19/176* (2014.01)
*H04N 19/184* (2014.01)
*H04N 19/186* (2014.01)

(52) U.S. Cl.
CPC ......... *H04N 19/172* (2014.11); *H04N 19/176* (2014.11); *H04N 19/184* (2014.11); *H04N 19/186* (2014.11)

(58) Field of Classification Search
CPC ......... H04N 19/12; H04N 2201/04789; H04N 2201/04791; H04N 2201/04729; H04N 2201/04731
See application file for complete search history.

(56) References Cited

U.S. PATENT DOCUMENTS

| | | | |
|---|---|---|---|
| 2021/0092347 A1* | 3/2021 | Han | H04N 13/282 |
| 2021/0092418 A1* | 3/2021 | Han | H04N 19/597 |
| 2022/0182630 A1* | 6/2022 | Liu | H04N 19/176 |
| 2023/0017146 A1* | 1/2023 | Zhang | H04N 19/105 |
| 2023/0061939 A1* | 3/2023 | Hu | H04N 19/18 |

\* cited by examiner

CODING EFFICIENCY OF BOUNDARY COORDINATES OF SRCC SCAN REGION

RELATED APPLICATIONS

This application is a continuation of International Application No. PCT/CN2021/131617, entitled "VIDEO CODING METHOD AND APPARATUS, VIDEO DECODING METHOD AND APPARATUS, COMPUTER READABLE MEDIUM, AND ELECTRONIC DEVICE," filed on Nov. 19, 2021, which claims priority to Chinese Patent Application No. 202110199310.0, entitled "VIDEO ENCODING METHOD AND APPARATUS, VIDEO DECODING METHOD AND APPARATUS, COMPUTER-READABLE MEDIUM, AND ELECTRONIC DEVICE" and filed on Feb. 22, 2021. The entire disclosures of the prior applications are hereby incorporated by reference.

FIELD OF THE TECHNOLOGY

This application belongs to the field of computer technologies, including a video encoding method and apparatus, a video decoding method and apparatus, a computer-readable medium, and an electronic device.

BACKGROUND OF THE DISCLOSURE

In the video encoding process, the encoder side generally needs to perform transformation, quantization, and entropy coding on residual data between original video data and predicted video data and transmit the processed residual data to the decoder side. If the energy of residual coefficients is not sufficiently concentrated, especially in a transformation skipping mode, the distribution of the residual coefficients is sparser, resulting in a range of a scan region to occupy more bits during encoding, thereby reducing the encoding efficiency and affecting the video compression performance.

SUMMARY

An objective of this disclosure is to provide a video encoding method and apparatus, a video decoding method and apparatus, a computer-readable medium, and an electronic device, to overcome the technical problem of low video encoding and decoding efficiency in the related art at least to a certain extent.

In an embodiment, a video decoding method includes obtaining a size of a coding block of a video image frame, the size of the coding block comprising a width and a height of the coding block, and decoding a bitstream of the coding block to obtain a value of a range variable associated with a SRCC scan region of the coding block. The range variable includes a width range variable corresponding to a width of the SRCC scan region and a height range variable corresponding to a height of the SRCC scan region. Each of the width range variable and the height range variable are obtained by comparing a prefix value of the width range variable and a prefix value of the height range variable respectively to one or more predefined value intervals. The method further includes determining a horizontal coordinate of boundary coordinates of the SRCC scan region according to a difference between the width of the coding block and the width range variable and determining a vertical coordinate of the boundary coordinates of the SRCC scan region according to a difference between the height of the coding block and the height range variable.

In an embodiment, a video decoding apparatus includes processing circuitry configured to obtain a size of a coding block of a video image frame, the size of the coding block comprising a width and a height of the coding block, and decode a bitstream of the coding block to obtain a value of a range variable associated with a scan region-based coefficient coding (SRCC) scan region of the coding block. The range variable includes a width range variable corresponding to a width of the SRCC scan region and a height range variable corresponding to a height of the SRCC scan region. Each of the width range variable and the height range variable are obtained by comparing a prefix value of the width range variable and a prefix value of the height range variable respectively to one or more predefined value intervals. The processing circuitry is further configured to determine a horizontal coordinate of boundary coordinates of the SRCC scan region according to a difference between the width of the coding block and the width range variable and determine a vertical coordinate of the boundary coordinates of the SRCC scan region according to a difference between the height of the coding block and the height range variable.

In an embodiment, a non-transitory computer-readable storage medium stores computer-readable instructions thereon, which, when executed by a computer device, cause the computer device to perform a video decoding method. The video decoding method includes obtaining a size of a coding block of a video image frame, the size of the coding block comprising a width and a height of the coding block, and decoding a bitstream of the coding block to obtain a value of a range variable associated with a SRCC scan region of the coding block. The range variable includes a width range variable corresponding to a width of the SRCC scan region and a height range variable corresponding to a height of the SRCC scan region. Each of the width range variable and the height range variable are obtained by comparing a prefix value of the width range variable and a prefix value of the height range variable respectively to one or more predefined value intervals. The method further includes determining a horizontal coordinate of boundary coordinates of the SRCC scan region according to a difference between the width of the coding block and the width range variable and determining a vertical coordinate of the boundary coordinates of the SRCC scan region according to a difference between the height of the coding block and the height range variable.

DESCRIPTION OF EMBODIMENTS

The exemplary implementations are now described comprehensively with reference to the accompanying drawings. However, the examples of implementations may be implemented in multiple forms, and it is not to be understood as being limited to the examples of implementations described herein. Conversely, the implementations are provided to make this disclosure more comprehensive and complete, and comprehensively convey the idea of the examples of the implementations to a person skilled in the art.

In addition, the described features, structures, or characteristics may be combined in one or more embodiments in any appropriate manner. In the following descriptions, a lot of specific details are provided to give a comprehensive understanding of the embodiments of this disclosure. However, a person skilled in the art is to be aware that, the technical solutions in this disclosure may be implemented without one or more of the particular details, or another method, unit, apparatus, or step may be used. In other cases, well-known methods, apparatuses, implementations, or operations are not shown or described in detail, to avoid obscuring the aspects of this disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions and do not necessarily include all of the content and operations/steps, nor are the flowcharts necessarily performed in the order described. For example, some operations/steps may be further divided, while some operations/steps may be combined or partially combined. Therefore, an actual execution order may change according to an actual case.

A "plurality of" mentioned herein means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
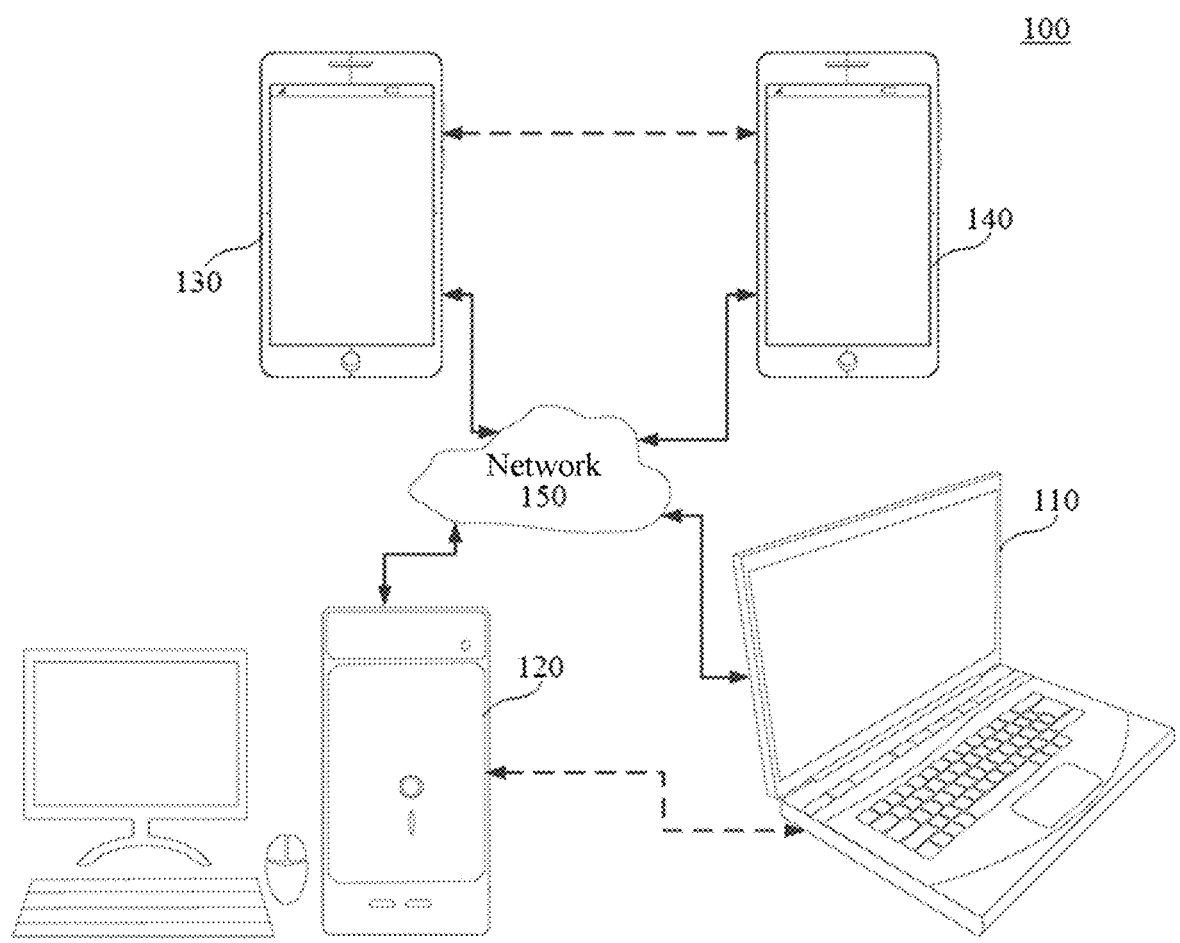
FIG. 1 is a schematic diagram of an exemplary system architecture to which a technical solution in an embodiment of this disclosure is applicable.

FIG. 1 is a schematic diagram of an exemplary system architecture to which a technical solution in an embodiment of this disclosure is applicable.

As shown in FIG. 1, a system architecture 100 includes a plurality of terminal apparatuses. The terminal apparatuses can communicate with each other through a network 150, for example. For example, the system architecture 100 may include a first terminal apparatus 110 and a second terminal apparatus 120 connected through the network 150. In the embodiment of FIG. 1, the first terminal apparatus 110 and the second terminal apparatus 120 perform unidirectional data transmission.

For example, the first terminal apparatus 110 may code video data (for example, a video picture stream captured by the first terminal apparatus 110) and transmit the coded video data to the second terminal apparatus 120 through the network 150. The coded video data is transmitted in a form of one or more coded video bit streams. The second terminal apparatus 120 may receive the coded video data through the network 150, decode the coded video data to recover the video data, and display a video picture according to the recovered video data.

In an embodiment of this disclosure, the system architecture 100 may include a third terminal apparatus 130 and a fourth terminal apparatus 140 that perform bidirectional transmission of the coded video data. The bidirectional transmission may be performed, for example, during a video conference. During the bidirectional data transmission, one of the third terminal apparatus 130 and the fourth terminal apparatus 140 may code video data (for example, a video picture stream captured by the terminal apparatus) and transmit the coded video data to the other of the third terminal apparatus 130 and the fourth terminal apparatus 140 through the network 150. One of the third terminal apparatus 130 and the fourth terminal apparatus 140 may further receive coded video data transmitted by the other of the third terminal apparatus 130 and the fourth terminal apparatus 140, and may decode the coded video data to recover the video data and may display a video picture on an accessible display apparatus according to the recovered video data.

In the embodiment of FIG. 1, the first terminal apparatus 110, the second terminal apparatus 120, the third terminal apparatus 130, and the fourth terminal apparatus 140 may be servers, personal computers, or smart phones, but the principle disclosed in this disclosure may not be limited thereto. The embodiments disclosed in this disclosure are applicable to laptop computers, tablet computers, media players, and/or dedicated video conferencing devices. The network 150 represents any number of networks through which coded video data is transmitted among the first terminal apparatus 110, the second terminal apparatus 120, the third terminal apparatus 130, and the fourth terminal apparatus 140, for example, including a wired and/or wireless communication network. The communication network 150 may exchange data in a circuit switching channel and/or a packet switching channel. The network may include a telecommunication network, a local area network, a wide area network, and/or the Internet. For the purpose of this disclosure, unless explained below, an architecture and a topology of the network 150 may be inessential to the operation disclosed in this disclosure.

Figure 2:
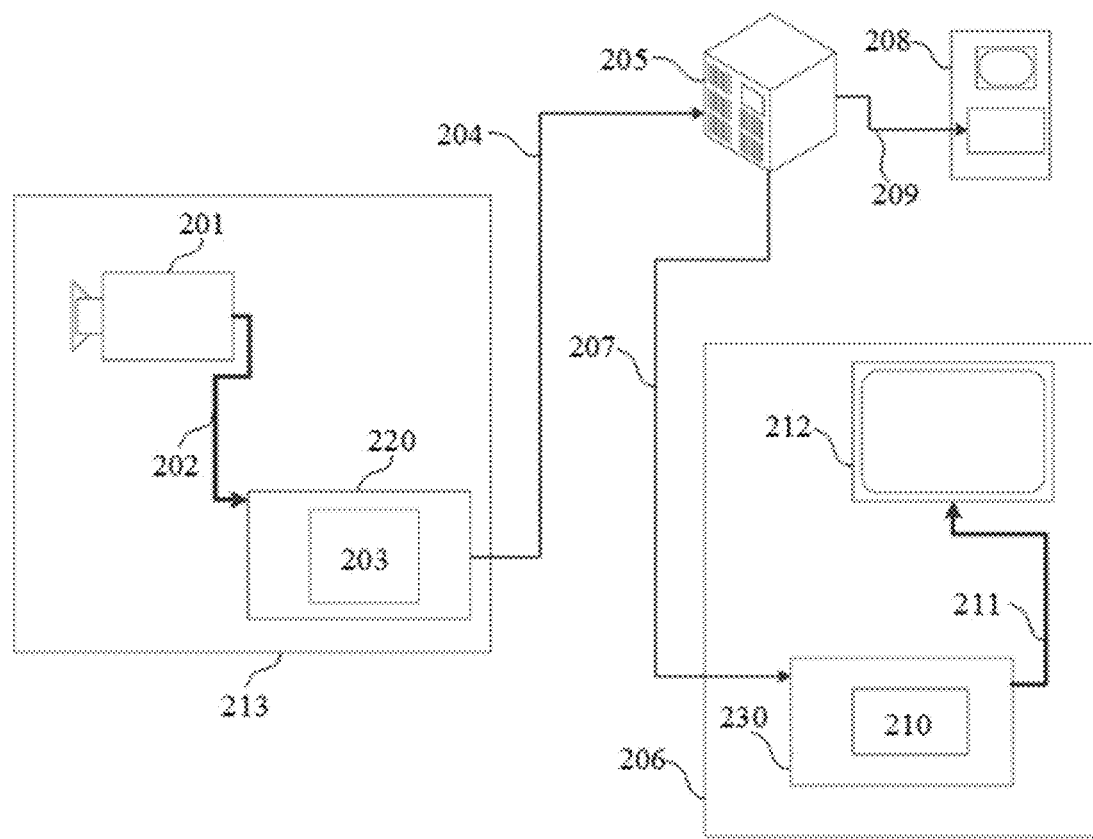
FIG. 2 is a schematic diagram of a placement manner of a video encoding apparatus and a video decoding apparatus in a streaming transmission system.

In an embodiment of this disclosure, FIG. 2 shows a placement manner of a video encoding apparatus and a video decoding apparatus in a streaming transmission environment. The subject disclosed in this disclosure may be comparably applicable to other video-enabled applications, including, for example, a video conference, a digital television (TV), and storage of compressed videos on digital media including a CD, a DVD, and a memory stick.

A streaming transmission system may include a capture subsystem 213. The capture subsystem 213 may include a video source 201 such as a digital camera. The video source creates an uncompressed video picture stream 202. In the embodiment, the video picture stream 202 includes a sample captured by the digital camera. Compared with the coded video data 204 (or a coded video bit stream 204), the video picture stream 202 is depicted by a thick line to emphasize the video picture stream with a large data volume. The video picture stream 202 may be processed by an electronic device 220. The electronic device 220 includes a video encoding apparatus 203 coupled to the video source 201. The video encoding apparatus 203 may include hardware, software, or a combination of hardware and software to realize or implement various aspects of the disclosed subject matter described in more detail below. Compared with the video picture stream 202, the coded video data 204 (or a coded video bit stream 204) is depicted by a thin line to emphasize the coded video data 204 with a small data volume (or a coded video bit stream 204), which may be stored on a streaming transmission server 205 for future use. One or more streaming transmission client subsystems, for example, a client subsystem 206 and a client subsystem 208 in FIG. 2, may access the streaming transmission server 205 to retrieve a copy 207 and a copy 209 of the coded video data 204. The client subsystem 206 may include, for example, a video decoding apparatus 210 in an electronic device 230. The video decoding apparatus 210 decodes an incoming copy 207 of the coded video data and generates an output video picture stream 211 that can be presented on a display 212 (such as a display screen) or an other presence apparatus. In some streaming transmission systems, the coded video data 204, the video data 207, and the video data 209 (for example, the video bit stream) may be coded according to some video coding/compression standards. Embodiments of the standards include ITU-T H.265. In an embodiment, a video coding standard under development is informally referred to as versatile video coding (VVC). This disclosure may be used in the context of the VVC standard.

The electronic device 220 and the electronic device 230 may include other components not shown in the figure. For example, the electronic device 220 may include a video decoding apparatus, and the electronic device 230 may further include a video encoding apparatus.

In an embodiment of this disclosure, international video coding standards such as High Efficiency Video Coding (HEVC) and the VVC and the Chinese national video coding standard such as the Audio Video coding Standard (AVS) are used as examples. When a video image frame is inputted, the video image frame is partitioned into a plurality of non-overlapping processing units according to a block size, and a similar compression operation is performed on each processing unit. The processing unit is referred to as a coding tree unit (CTU) or a largest coding unit (LCU). The CTU may be further partitioned more finely to obtain one or more basic coding units (CU). The CU is the most basic element in a coding process. Some concepts during coding of the CU are described below.

Predictive coding: The predictive coding includes modes such as intra prediction and inter prediction. After an original video signal is predicted by using a selected reconstructed video signal, a residual video signal is obtained. An encoder side is required to select a predictive coding mode for a current CU and inform a decoder side. The intra prediction means that a predicted signal comes from a region that has been coded and reconstructed in a same image. The inter prediction means that the predicted signal comes from a coded image (referred to as a reference image) that is different from a current image.

Transform and Quantization: Transform operations such as Discrete Fourier Transform (DFT) and Discrete Cosine Transform (DCT) are performed on a residual video signal to convert the signal into a transform domain, which is referred to as a transform coefficient. A lossy quantization operation is further performed on the transform coefficient, which loses a specific amount of information, so that the quantized signal facilitates compressed expression. In some video coding standards, more than one transform mode may be selected. Therefore, the encoder side is also required to select one transform mode for the current CU and inform the decoder side. Fineness of the quantization is generally determined by a quantization parameter (QP). A larger QP indicates that coefficients with a larger value range are to be quantized into a same output, which usually brings greater distortion and a lower bit rate. On the contrary, a smaller QP indicates that coefficients within a smaller value range are to be quantized into a same output, which generally brings less distortion and a higher bit rate.

Entropy coding or statistical coding: Statistical compression coding is performed on the quantized signal in the transform domain according to a frequency of occurrence of each value, and finally a binarized (0 or 1) compressed bit stream is outputted. In addition, entropy coding is also required to be performed on other information generated during the coding, such as the selected coding mode and motion vector data, to reduce a bit rate. Statistical coding is a lossless coding manner that can effectively reduce a bit rate required for expressing a same signal. A common statistical coding mode includes variable length coding (VLC for short) or context adaptive binary arithmetic coding (CABAC for short).

A context adaptive binary arithmetic coding (CABAC) process mainly includes three steps: binarization, context modeling, and binary arithmetic coding. After binarization of inputted syntax elements, the binary data may be encoded by an encoding mode and a bypass coding mode. The bypass coding mode does not require the assignment of a specific probability model to each binary bit, and an inputted binary bit bin value is directly encoded using a simple bypass encoder to speed up the entire encoding and decoding process. In general, different syntax elements are not completely independent, and the same syntax elements themselves have a certain memory. Thus, according to the conditional entropy theory, using other coded syntax elements for conditional coding can further improve the coding performance compared with independent coding or memoryless coding. Encoded symbolic information that is used as a condition is called a context. In the encoding mode, binary bits of a syntax element sequentially enter a context modeler. The encoder allocates a suitable probability model for each inputted binary bit based on a value of a previously encoded syntax element or binary bit. This process is called context modeling. A context model corresponding to a syntax element can be located via ctxIdxInc (context index increment) and ctxIdxStart (context index start). After feeding the bin value and the allocated probability model together into a binary arithmetic encoder for encoding, the context model needs to be updated according to the bin value. This is an adaptive process in the encoding.

Loop filtering: Operations such as inverse quantization, inverse transform, and predictive compensation are performed on a transformed and quantized signal to obtain a reconstructed image. The reconstructed image has some information different from that in an original image as a result of quantization, that is, the reconstructed image may cause distortion. Therefore, a filtering operation may be performed on the reconstructed image, for example, by using filters such as a deblocking filter (DB), a sample adaptive offset (SAO) filter, or an adaptive loop filter (ALF), which can effectively reduce a degree of distortion caused by quantization. Since the filtered reconstructed images are to be used as a reference for subsequently coded images to predict future image signals, the foregoing filtering operation is also referred to as loop filtering, that is, a filtering operation in a coding loop.

Figure 3:
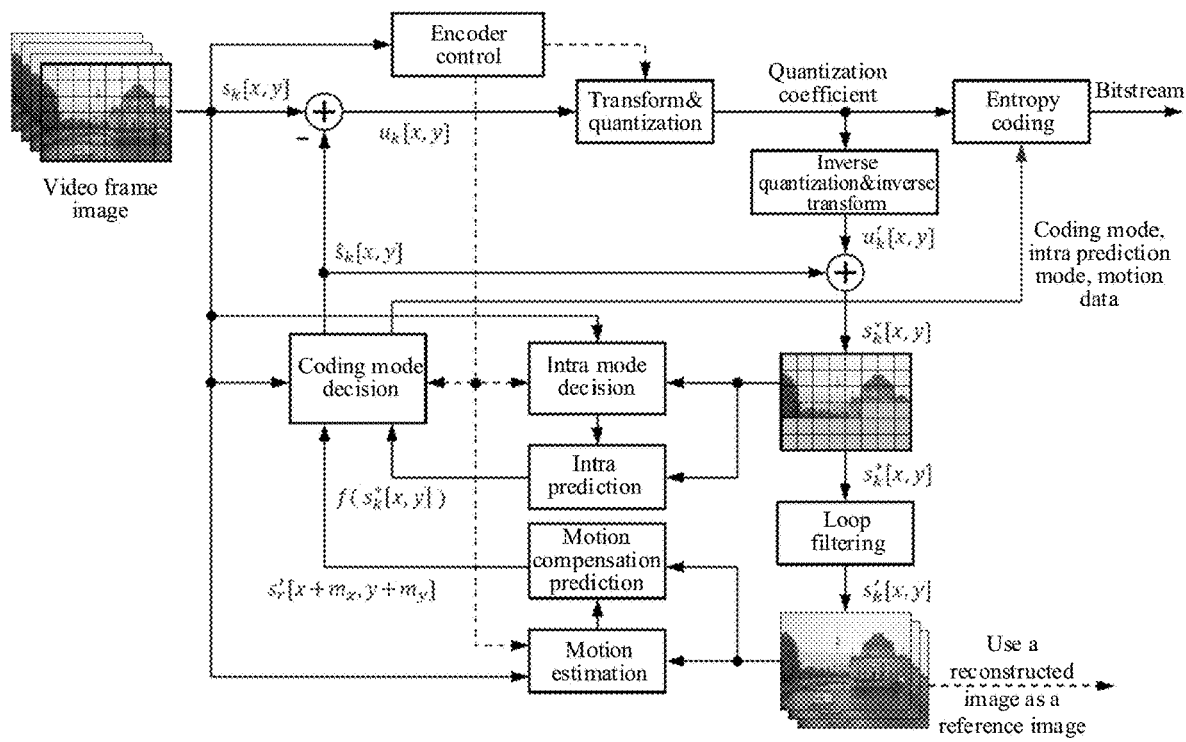
FIG. 3 is a basic flowchart of a video encoder.

In an embodiment of this disclosure, FIG. 3 is a basic flowchart of a video encoder. In this process, intra prediction is used as an example for description. A difference between an original image signal $s_k[x, y]$ and a predicted image signal $\hat{s}_k[x, y]$ is calculated to obtain a residual signal $u_k[x, y]$, and the residual signal $u_k[x, y]$ is transformed and quantized to obtain a quantization coefficient. The quantization coefficient is subjected to entropy coding to obtain a coded bit stream, and is further subjected to inverse quantization and inverse transform to obtain a reconstructed residual signal $u'_k[x, y]$. The predicted image signal $\hat{s}_k[x, y]$ is superimposed with the reconstructed residual signal $u'_k[x, y]$ to generate an image signal $s_k^*[x, y]$. The image signal $s_k^*[x, y]$ is inputted to an intra mode decision module and an intra prediction module for intra prediction, and is further subjected to loop filtering to output a reconstructed image signal $s'^k[x, y]$. The reconstructed image signal $s'^k[x, y]$ may be used as a reference image for a next frame for motion estimation and motion compensation prediction. Then a predicted image signal $\hat{s}'_k[x, y]$ of the next frame is obtained based on a result $s'_r[x+m_x, y+m_y]$ of the motion compensation prediction and a result $f(s_k^*[x, y])$ of the intra prediction. The above process is repeated until the encoding is completed.

Based on the foregoing coding process, on the decoder side, for each CU, after a compressed bit stream is acquired, entropy decoding is performed to obtain various mode information and quantization coefficients. Then inverse quantization and inverse transform are performed on the quantization coefficients to obtain a residual signal. Moreover, a predicted signal corresponding to the CU can be obtained according to coding mode information that is known. Then the residual signal may be added to the predicted signal to obtain a reconstructed signal. The reconstructed signal is then subjected to operations such as loop filtering to generate a final output signal.

During the above coding and decoding, the transform processing performed on the residual signal causes energy of the residual signal to concentrate on few low-frequency coefficients, that is, most coefficients have relatively small values. After being processed by a subsequent quantization module, the relatively small coefficient values become zero, which greatly reduces costs of coding the residual signal. However, due to diversified residual distribution, the DCT cannot adapt to all residual characteristics. Therefore, transform kernels such as DST7 and DCT8 are applied to the transform process, and horizontal transform and vertical transform of the residual signal can be performed by using different transform kernels. An adaptive multiple core transform (AMT) technology is used as an example. Possible transform combinations for transform processing of the residual signal include (DCT2, DCT2), (DCT8, DCT8), (DCT8, DST7), (DST7, DCT8), and (DST7, DST7). For one residual signal, a specific transform combination to be selected needs to be decided at the encoder side by using Rate-Distortion Optimization (RDO). In addition, in a case where the residual distribution correlation within the residual block is weak, the residual signal may be directly quantified without being transformed, that is, the transformation is skipped. Whether the current residual block belongs to the transform skip mode may be explicitly encoded or implicitly decided.

Figure 4:
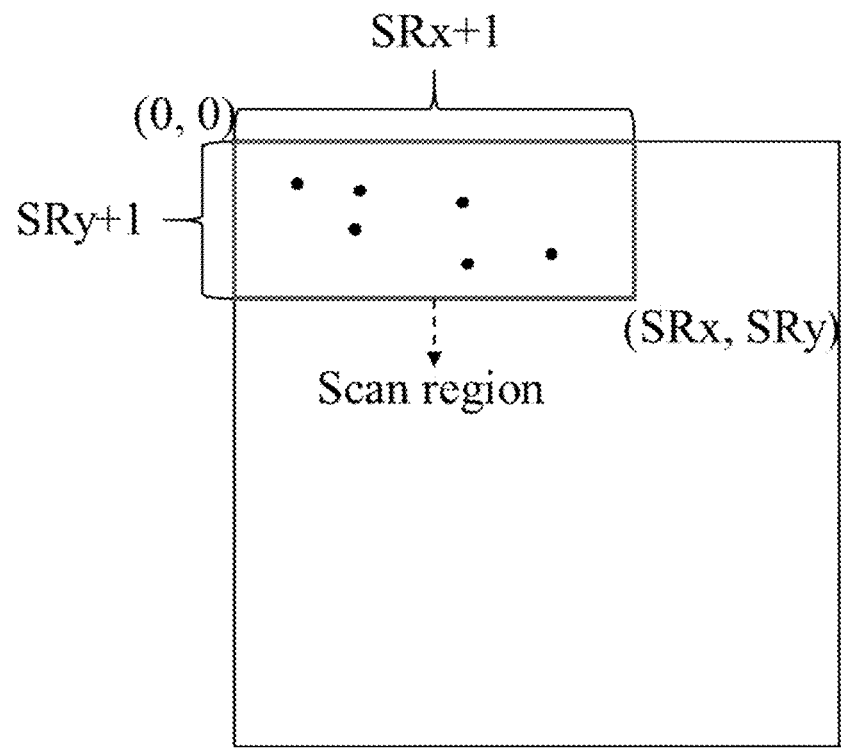
FIG. 4 shows a scan region labeled by SRCC technique.
Figure 5:
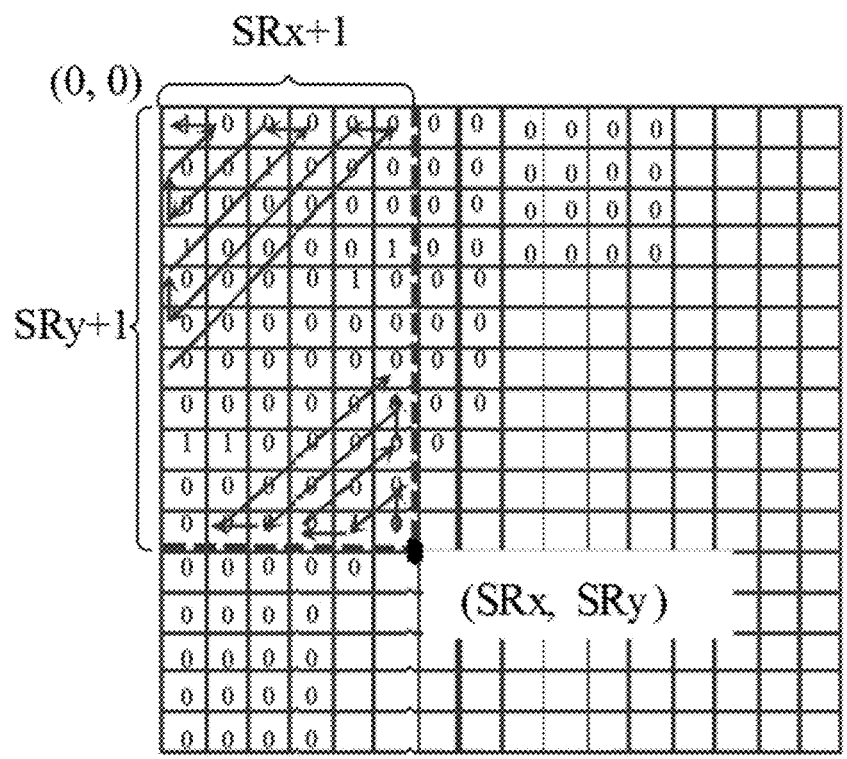
FIG. 5 shows a schematic diagram of a sequence of scanning a labeled scan region.

After transform and quantization of a residual signal nonzero coefficients in a quantization coefficient block are highly likely gather in a left area and an upper area of the block, and 0s generally appear in a right area and a lower area of the block. Therefore, an SRCC technology is introduced. Through the SRCC technology, it may be labeled that the size of an upper left area of nonzero coefficients included in each quantization coefficient block (having a size of W×H) is (SRx+1)×(SRy+1). SRx is a horizontal coordinate of a rightmost nonzero coefficient in a quantization coefficient block, SRy is a vertical coordinate of a lowermost nonzero coefficient in the quantization coefficient block, and coordinates of an upper left origin are (0, 0). 1≤SRx+1≤W, and 1≤SRy+1≤H. Coefficients outside the area are all 0. In the SRCC technology, a quantization coefficient area that needs to be scanned in one quantization coefficient block is determined by using (SRx, SRy). As shown in FIG. 4, only quantization coefficients in a scan region labeled by (SRx, SRy) need to be coded. A scan order of coding is shown in FIG. 5, and may be an opposite Z shaped scan from the lower right corner to the upper left corner.

The coefficients to be coded within the SRCC region are coded using a hierarchical approach. Specifically, first, coordinates of the SRCC scan region are encoded. Then, within the SRCC region, a flag (significant flag) that identifies whether the coefficient at the current position is 0 is encoded one by one based on the scan order. Meanwhile, non-zero coefficient positions are recorded and the number of non-zero coefficients is calculated. If the number of non-zero coefficients is greater than 0, non-zero coefficient absolute levels and symbols at the corresponding positions need to be encoded.

Taking AVS3 standard as an example, a video codec uses a scan region-based coefficient coding (SRCC) technology. Before all coefficients in the SRCC region are encoded, the right abscissa scan_region_x (the value is SRx) and the bottom ordinate scan_region_y (the value is SRy) of the SRCC scan region are encoded first. In existing AVS standard, the value SRx of scan_region_x and the value SRy of scan_region_y are encoded directly.

Considering that the boundary of the SRCC region depends mainly on positions of rightmost and lowest non-zero coefficients in the current block, and the energy of a transformed coding block after transformation is mainly concentrated at limited low-frequency coefficient positions, an area of the SRCC region, SRx, and SRy tend to have relatively small values. However, for a coding block in a transform skip mode, because there is no transform process, residual coefficient energy is not concentrated, and the distribution of non-zero coefficients may be relatively sparser. Therefore, the area of the SRCC region of the coding block in the transform skip mode, SRx, and SRy tend to have relatively larger values. Therefore, if SRx and SRy are also directly encoded in the transform skip mode, more bits may be required during encoding SRx and SRy in the transform skip mode, thereby reducing the encoding efficiency.

In this disclosure, according to statistical characteristics of coordinates of an SRCC region in a transform skip mode, a method for encoding and decoding coordinates of an SRCC scan region is provided. That is, a value SRx of a right abscissas scan_region_x and a value SRy of a bottom ordinate scan_region_y of the SRCC scan region are not directly encoded, but a value of width-1-SRx (denoted as width_minus1_minus_scan_region_x) and a value of height-1-SRy (denoted as height_minus1_minus_scan_region_y) are encoded. During decoding, values of width_minus1_minus_scan_region_x and height_minus1_minus_scan_region_y are first decoded and deducted from a bitstream. Then, the value of the right abscissas scan_region_x of the SRCC scan region can be obtained as SRx=width-1-width_minus1_minus_scan_region_x, and the value of the bottom ordinate scan_region_y can be obtained as SRy=height-1-height_minus1_minus_scan_region_y. The improved encoding method can reduce the number of bits required for encoding and help improve the encoding efficiency of coefficient encoding, thereby further improving the video compression performance.

The method for encoding coordinates of an SRCC scan region provided in this disclosure is not limited to being applied to be performed on coordinates of an SRCC scan region in a transform skip mode. The method may be used during coordinate encoding of an SRCC scan region in coefficient encoding in other coding modes, for example, applied to coordinate encoding of an SRCC scan region of all blocks, e.g., applied when a picture-level intra prediction transform skip enable flag picture_ist_skip_enable_flag has a value of 1; applied when a picture-level inter prediction transform skip enable flag picture_inter_trasform_skip_flag has a value of 1; and applied when picture_ist_skip_enable_flag and picture_inter_trasform_skip_flag both have a value of 1, and so on.

In some embodiments, width_minus1_minus_scan_region_x and height_minus1_minus_scan_region_y are encoded in a transform skip mode, and an original coding mode is maintained in other modes, that is, SRx and SRy are directly encoded.

In some other embodiments, methods for coordinate encoding of an SRCC scan region of all blocks are a method of encoding width_minus1_minus_scan_region_x and height_minus1_minus_scan_region_y.

In some other embodiments, another combination method is to maintain the original coding mode in the transform skip mode. That is, SRx and SRy are directly encoded, and width_minus1_minus_scan_region_x and height_minus1_minus_scan_region_y are encoded in other modes.

In some other embodiments, width_minus1_minus_scan_region_x and height_minus1_minus_scan_region_y are encoded in a case that a picture-level intra prediction transform skip enable flag has a value of 1, and an original coding mode is maintained under other conditions, that is, SRx and SRy are directly encoded.

In some other embodiments, width_minus1_minus_scan_region_x and height_minus1_minus_scan_region_y are encoded when a picture-level inter prediction transform skip enable flag has a value of 1, and an original coding mode is maintained under other conditions, that is, SRx and SRy are directly encoded.

In some other embodiments, width_minus1_minus_scan_region_x and height_minus1_minus_scan_region_y are encoded when both the picture-level intra prediction transform skip enable flag and the picture-level inter prediction transform skip enable flag have a value of 1, and an original coding mode is maintained under other conditions, that is, SRx and SRy are directly encoded.

In the embodiments of this disclosure, whether to use the transform skip mode for the coding block may be determined by explicit encoding or implicit selection of transform skip. The explicit encoding means that before the coefficient absolute level is decoded, a flag used for indicating whether to use the transform skip mode for the coding block is decoded, and the decoding result of the flag explicitly indicates whether the current coding block needs to skip the transformation process. Implicit selection of transform skip means that in a case that no corresponding flag exists, statistics are collected on decoding results of coefficients, and then it is determined whether to skip the transformation process based on the statistical result. For example, all coefficients may be first obtained by decoding, the number of non-zero coefficients among all the coefficients is calculated, and the number of even coefficients among all the coefficients (including zero coefficients) is calculated. Then whether to use the transform skip mode for the current coding block is implicitly deduced according to whether the number of non-zero coefficients is an even or odd number or whether the number of even coefficients among all the coefficients is an even or odd number (e.g., when the number of non-zero coefficients is an odd number, it is determined that transform skip has been used for the current coding block; when the number of non-zero coefficients is an even number, it is determined that transform skip has not been used for the current coding block; when the number of even coefficients among all the coefficients is an even number, it is determined that transform skip has been used for the current coding block; or when the number of even coefficients among all the coefficients is an odd number, it is determined that transform skip has not been used for the current coding block).

picture_ist_skip_enable_flag and picture_inter_trasform_skip_flag are flags used for controlling whether implicit selection of transform skip can be used within/between frames. In the embodiments of this disclosure, syntax elements related to the transform skip mode are explained below.

Implicit selection of transform skip enable flag ist_skip_enable_flag:

It is a binary variable. It has a value of '1' indicating that implicit selection of transform skip can be used; and a value of '0' indicating that implicit selection of transform skip is not to be used. The value of the variable IstSkipEnableFlag may be obtained by decoding the syntax element ist_skip_enable_flag. If the syntax element ist_skip_enable_flag does not exist in the bitstream, IstSkipEnableFlag may be set to 0.

Inter transform skip enable flag inter_transform_skip_enable_flag:

It is a binary variable. It has a value of '1' indicating that inter transform skip can be used; and a value of '0' indicating that inter transform skip is not to be used. The value of the variable InterTransformSkipEnableFlag may be obtained by decoding the syntax element inter_transform_skip_enable_flag. If the syntax element inter_transform_skip_enable_flag does not exist in the bitstream, InterTransformSkipEnableFlag may be set to 0.

Picture-level intra prediction transform skip enable flag picture_ist_skip_enable_flag:

It is a binary variable. It has a value of '1' indicating that the transform skip method can be used for a luminance intra predicted residual block and a luminance intra block copy predicted residual block of the current image; and a value of '0' indicating that the transform skip method is not to be used for the luminance intra predicted residual block and the luminance intra block copy predicted residual block of the current image. The value of the variable PictureIstSkipEnableFlag may be obtained by decoding the syntax element picure_ist_skip_enable_flag. If the syntax element picture_ist_skip_enable_flag does not exist in the bitstream, PictureIstSkipEnableFlag may be set to 0.

Picture-level inter prediction transform skip enable flag picture_inter_trasform_skip_flag:

It is a binary variable. It has a value of '1' indicating that the transform skip method can be used for a luminance inter predicted residual block of the current image; and a value of '0' indicating that the transform skip method is not to be used for the luminance inter predicted residual block of the current image. The value of PictureInterSkipEnableFlag may be obtained by decoding the syntax element picture_inter_trasform_skip_flag. If the syntax element picture_inter_trasform_skip_flag does not exist in the bitstream, PictureInterSkipEnableFlag may be set to 0.

The implementation details of the technical solutions of the embodiments of this disclosure are described in detail below with reference to specific application scenarios.

Figure 6:
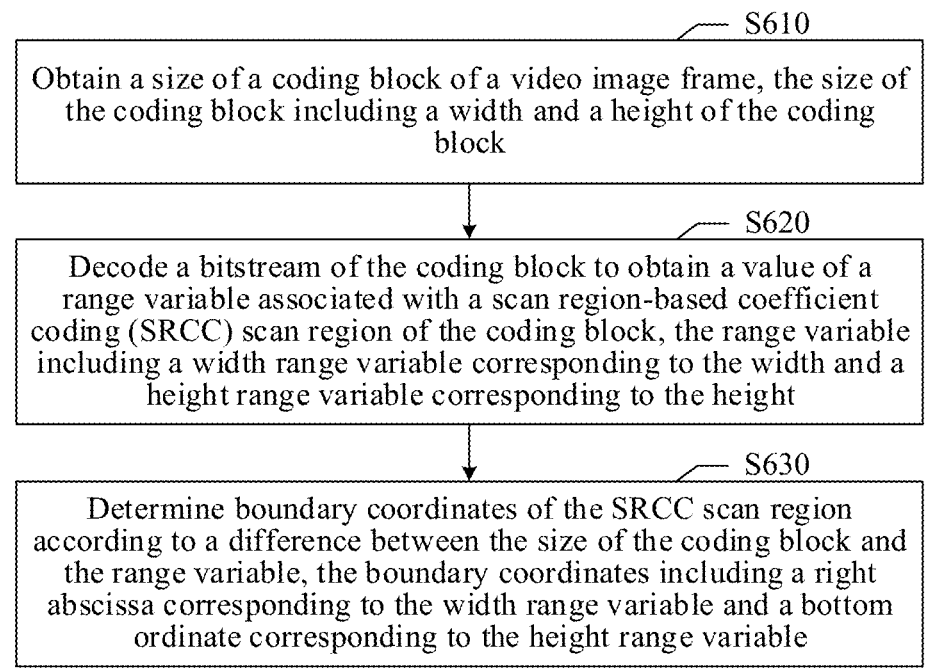
FIG. 6 is a flowchart of steps of a video decoding method according to an embodiment of this disclosure.

FIG. 6 is a flowchart of steps of a video decoding method according to an embodiment of this disclosure. The video decoding method may be performed by a device having a computing processing function, for example, may be performed by a terminal device or a server, or may be performed by an electronic device shown in FIG. 14. Referring to FIG. 6, the video decoding method mainly includes step S610 to step S630 below.

Step S610: Obtain a size of a coding block of a video image frame, the size of the coding block including a width and a height of the coding block.

In an embodiment of this disclosure, a video image frame sequence includes a series of images. Each image may be further partitioned into slices, and the slices may be further partitioned into a series of LCUs (or CTUs), each LCU including a plurality of CUs. The video image frame is coded by block during coding. In some new video coding standards, for example, in the H.264 standard, a macroblock (MB) is provided. The MB may be further partitioned into a plurality of prediction blocks (PB) that may be used for predictive coding. In the HEVC standard, basic concepts such as a CU, a prediction unit (PU), and a transform unit (TU) are used, various block units are partitioned by function, and a new tree-based structure is used for description. For example, a CU may be partitioned into smaller CUs according to a quadtree, and the smaller CUs may be further partitioned to form a quadtree structure. The coding block in this embodiment of this disclosure may be a CU, or a block smaller than the CU, such as a smaller block obtained by partitioning the CU.

Step S620: Decode a bitstream of the coding block to obtain a value of a range variable associated with a scan region-based coefficient coding (SRCC) scan region of the coding block, the range variable including a width range variable corresponding to the width and a height range variable corresponding to the height. For example, a bitstream of the coding block is decoded to obtain a value of a range variable associated with a scan region-based coefficient coding (SRCC) scan region of the coding block. The range variable includes a width range variable corresponding to a width of the SRCC scan region and a height range variable corresponding to a height of the SRCC scan region. Each of the width range variable and the height range variable are obtained by comparing a prefix value of the width range variable and a prefix value of the height range variable respectively to one or more predefined value intervals.

In an embodiment of this disclosure, syntax elements related to scan_region_x are decoded and inversely binarized from a bitstream, and a width range variable width_minus1_minus_scan_region_x is set to a deducted value. The width range variable represents a result obtained by subtracting 1 from a width of a current coding block and then subtracting a value SRx of a right abscissa scan_region_x of an SRCC scan region. Then, the syntax elements related to scan_region_y can be decoded and inversely binarized from the bitstream, and a deducted value is recorded as a height range variable height_minus1_minus_scan_region_y. The height range variable represents a result obtained by subtracting 1 from a height of the current coding block and then subtracting a value SRy of a bottom ordinate scan_region_y of the SRCC scan region.

Step S630: Determine boundary coordinates of the SRCC scan region according to a difference between the size of the coding block and the range variable, the boundary coordinates including a right abscissa corresponding to the width range variable and a bottom ordinate corresponding to the height range variable. For example, a horizontal coordinate of boundary coordinates of the SRCC scan region is determined according to a difference between the width of the coding block and the width range variable and a vertical coordinate of the boundary coordinates of the SRCC scan region is determined according to a difference between the height of the coding block and the height range variable.

Using the definition of the width range variable, it can be determined that the width range variable, the value of the right abscissa of the SRCC scan region, and the width of the coding block satisfy the following formula:

$$\text{Width\_minus1\_minus\_scan\_region\_}x + (SRx+1) = \text{width}$$

Therefore, the value of the right abscissa scan_region_x of the SRCC scan region can be obtained as:

$$SRx = \text{width} - 1 - \text{width\_minus1\_minus\_scan\_region\_}x.$$

Using the definition of the height range variable, it can be determined that the height range variable, the bottom ordinate of the SRCC scan region, and the height of the coding block satisfy the following formula:

$$\text{height\_minus1\_minus\_scan\_region\_}y + (SRy+1) = \text{height}$$

Therefore, the value of the bottom ordinate scan_region_x of the SRCC scan region can be obtained as:

$$SRy = \text{height} - 1 - \text{height\_minus1\_minus\_scan\_region\_}y.$$

Figure 7:
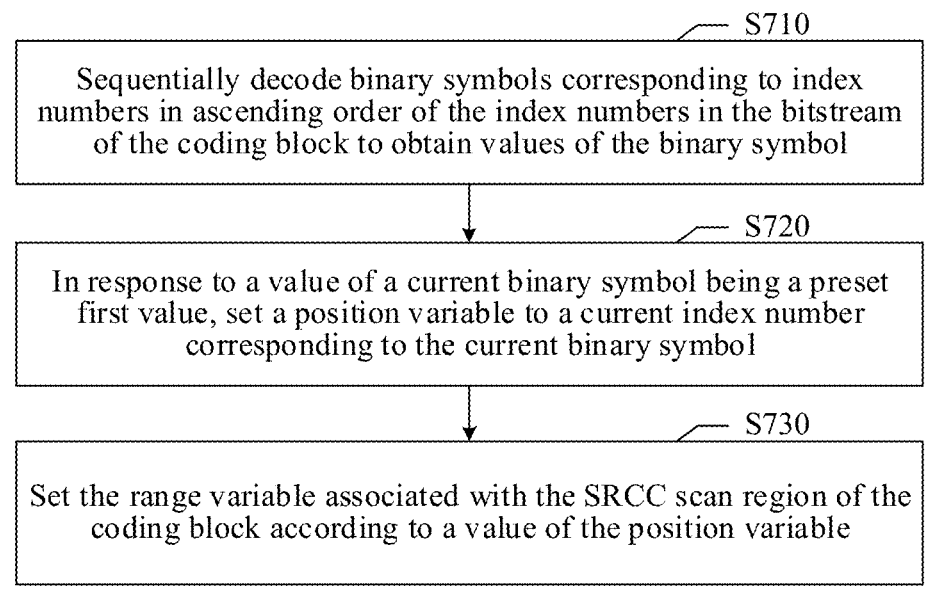
FIG. 7 is a flowchart of steps of decoding a range variable based on a bitstream distribution position of a binary symbol according to an embodiment of this disclosure.

In an embodiment of this disclosure, the range variable may be decoded according to positional distribution characteristics of the binary symbol in the bitstream. FIG. 7 is a flowchart of steps of decoding a range variable based on a bitstream distribution position of a binary symbol according to an embodiment of this disclosure. As shown in FIG. 7, based on the above embodiments, the step S620 of decoding a bitstream of the coding block to obtain a value of a range variable associated with a scan region-based coefficient coding (SRCC) scan region of the coding block may include the following step S710 to step S730.

Step S710: Sequentially decode binary symbols corresponding to index numbers in ascending order of the index numbers in the bitstream of the coding block to obtain values of the binary symbol.

In an embodiment of this disclosure, a binary symbol in a bitstream of a coding block is recorded as bin, and a corresponding index number is binIdx. For binIdx=0~(group_idx[min(T,32)−1]−1), bin values of a binIdx-th bit are entropy decoded in the bitstream one by one in a CABAC manner. When width_minus1_minus_scan_region_x needs to be decoded, T=width. When height_minus1_minus_scan_region_y needs to be decoded, T=height. The group_idx[64]={0, 1, 2, 3, 4, 4, 5, 5, 6, 6, 6, 6, 7, 7, 7, 7, 8, 8, 8, 8, 8, 8, 8, 8, 9, 9, 9, 9, 9, 9, 9, 9, 10, 10, 10, 10, 10, 10, 10, 10, 10, 10, 10, 10, 10, 10, 10, 10, 11, 11, 11, 11, 11, 11, 11, 11, 11, 11, 11, 11, 11, 11, 11, 11}.

Step S720: In response to a value of a current binary symbol being a preset first value, set a position variable to a current index number corresponding to the current binary symbol.

In an embodiment of this disclosure, the first value is 0, and if a value of a current binary symbol obtained through decoding currently is 0, that is, bin=0, then the position variable pos may be set to a current index number corresponding to the current binary symbol, that is, pos=binIdx. If the value of the current binary symbol is not the first value (for example the value is 1, that is, bin=1), then binIdx=binIdx+1, and subsequent other binary symbols are read.

Step S730: Set the range variable associated with the SRCC scan region of the coding block according to a value of the position variable.

In an embodiment of this disclosure, the method for setting the range variable associated with the SRCC scan region of the coding block according to a value of the position variable may include: comparing the value of the position variable with a preset second value; setting the range variable to the second value in response to the value of the position variable being less than or equal to the second value; and determining a prefix value according to the value of the position variable and determining a suffix value according to a decoding result of other binary symbols after the current binary symbol, in response to the value of the position variable being greater than the second value, and setting the range variable to a sum of the prefix value and the suffix value.

For example, the second value is 3, and if the value of the position variable is pos<=3, width_minus1_minus_scan_region_x or height_minus1_minus_scan_region_y is set to pos. If the value of the position variable is pos>3, it is necessary to further determine a prefix value and a suffix value, thereby setting a current decoded range variable width_minus1_minus_scan_region_x or height_minus1_minus_scan_region_y according to a sum of the prefix value and the suffix value.

In an embodiment of this disclosure, the method for determining a prefix value according to the value of the position variable may include: performing mapping processing on the value of the position variable according to a first mapping vector to obtain a first mapping value corresponding to the value of the position variable; and determining the prefix value according to the first mapping value.

For example, the first mapping vector is recorded as min_in_group[14]={0, 1, 2, 3, 4, 6, 8, 12, 16, 24, 32, 48, 64, 96}, and when the value of the position variable is greater than the second value, the prefix value is pre=min_in_group[pos].

In an embodiment of this disclosure, the method for determining a suffix value according to a decoding result of other binary symbols after the current binary symbol may include: determining a target number of other binary symbols to be decoded according to the value of the position variable; and decoding the target number of other binary symbols after the current binary symbol to obtain the suffix value. In this embodiment of this disclosure, the target number of other binary symbols after the current binary symbol may be entropy decoded based on a bypass decoding manner; and the target number is then determined as a length len of a fixed-length code, and inverse binarization is performed on a result of the entropy decoding based on a fixed-length code of len bits to obtain the suffix value.

For example, when the value of the position variable is greater than the second value, and after the corresponding prefix value pre is determined, in this embodiment of this disclosure, len=(pos−2)>>1 bin may continue to be decoded in the bitstream in a bypass manner and be inversely binarized in based on a len-bit fixed-length code (see Table 1 below) to obtain the suffix value suf; and Then, the current decoded width range variable width_minus1_minus_scan_region_x or height range variable height_minus1_minus_scan_region_y can be set to pre+suf.

TABLE 1

Relationship between SynElVal and binary symbol strings
(fixed-length code with a length of len)

| Value of synElVal | Binary symbol string | | | | |
|---|---|---|---|---|---|
| 0 | 0 | 0 | ... | 0 | 0 |
| 1 | 0 | 0 | ... | 0 | 1 |
| 2 | 0 | 0 | ... | 1 | 0 |
| 3 | 0 | 0 | ... | 1 | 1 |
| ... | | | ... | | |
| $2^{len}-4$ | 1 | 1 | ... | 0 | 0 |
| $2^{len}-3$ | 1 | 1 | ... | 1 | 0 |
| $2^{len}-2$ | 1 | 1 | ... | 1 | 0 |
| $2^{len}-1$ | 1 | 1 | ... | 1 | 1 |
| binIdx | 0 | 1 | ... | len-2 | len-1 |

Figure 8:
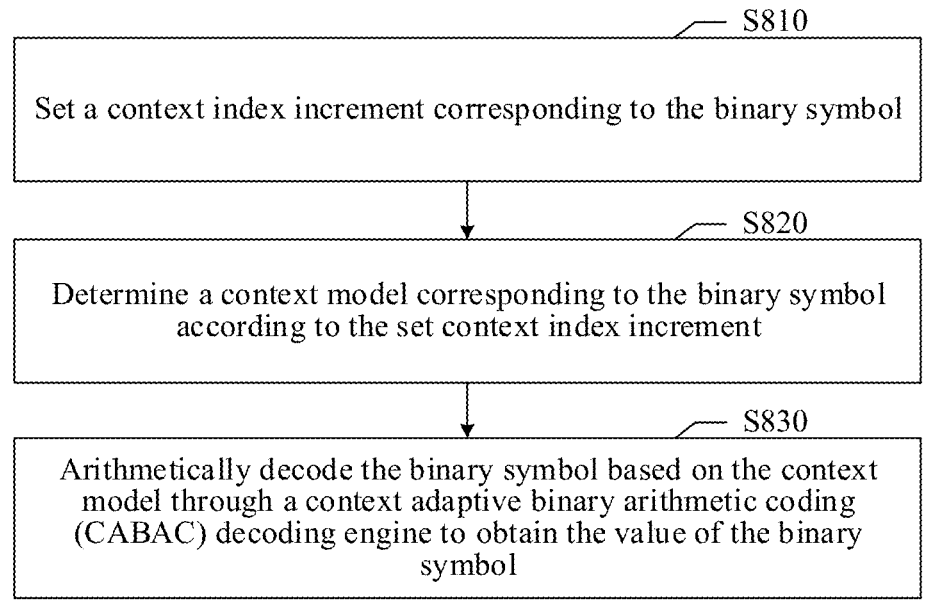
FIG. 8 is a flowchart of steps of decoding a binary symbol according to an embodiment of this disclosure.

FIG. 8 is a flowchart of steps of decoding a binary symbol according to an embodiment of this disclosure. As shown in FIG. 8, based on the above embodiments, the step S710 of sequentially decoding binary symbols corresponding to index numbers in ascending order of the index numbers to obtain values of the binary symbol may include the following step S810 to step S830.

Step S810: Set a context index increment corresponding to the binary symbol.

Step S820: Determine a context model corresponding to the binary symbol according to the set context index increment.

Step S830: Arithmetically decode the binary symbol based on the context model through a context adaptive binary arithmetic coding (CABAC) decoding engine to obtain the value of the binary symbol.

In an embodiment of this disclosure, the context index increment may be set to an index number corresponding to the binary symbol, that is, ctxIdxInc=binIdx.

Figure 9:
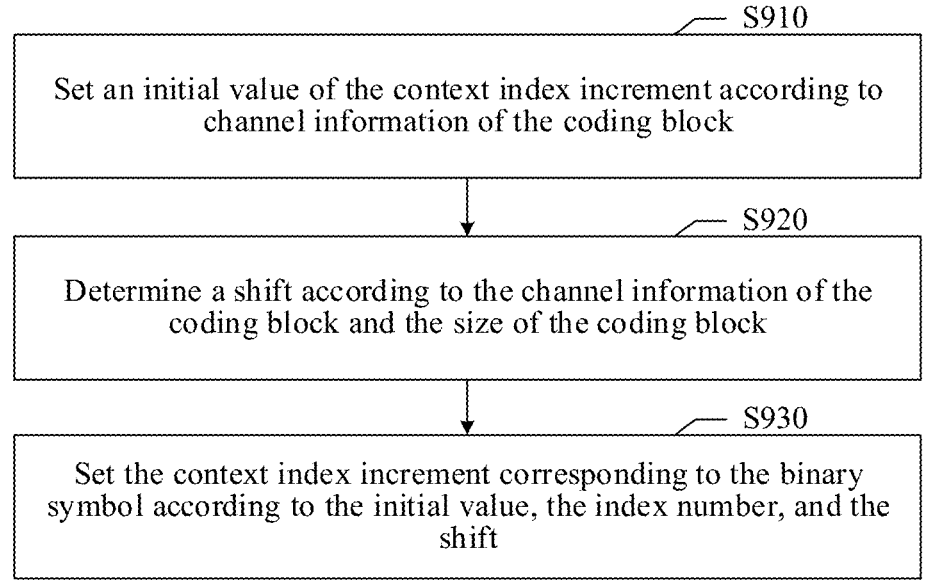
FIG. 9 is a flowchart of steps of setting a context index increment corresponding to a binary symbol according to an embodiment of this disclosure.

In an embodiment of this disclosure, the context index increment may also be set according to the relevant position information of the binary symbol. FIG. 9 is a flowchart of steps of setting a context index increment corresponding to a binary symbol according to an embodiment of this disclosure. As shown in FIG. 9, based on the above embodiments, the step S810 of setting a context index increment corresponding to the binary symbol may include the following step S910 to step S930.

Step S910: Set an initial value of the context index increment according to channel information of the coding block.

In an embodiment of this disclosure, the initial value of the context index increment is set to a preset third value in response to the coding block being a luma block; and a fourth value related to the size of the coding block is determined and the third value is increased by the fourth value to obtain the initial value of the context index increment, in response to the coding block being a chroma block.

In an embodiment of this disclosure, the method for determining a fourth value related to the size of the coding block may include: performing mapping processing on the size of the coding block according to a second mapping vector to obtain a second mapping value corresponding to the size of the coding block; and determining the second mapping value as the fourth value related to the size of the coding block.

For example, the third value may be 0, and if the current coding block is a luma block, ctxIdxInc=0. If the current coding block is a chroma block, then ctxIdxInc=ctxIdxInc+25+prefix_ctx[log V]. The second mapping vector is recorded as prefix_ctx[8]={0, 0, 0, 3, 6, 10, 15, 21}. When width_minus1_minus_scan_region_x needs to be decoded, V=width, and then log V=log(width). When height_minus1_minus_scan_region_y needs to be decoded, V=height, and then log V=log(height).

Step S920: Determine a shift according to the channel information of the coding block and the size of the coding block.

In an embodiment of this disclosure, if the coding block is a luma block, the shift is determined according to the formula shift_x=clip3 (0,2, (log V+1)>>2), where shift_x is the shift, V is the size of the coding block, and when width_minus1_minus_scan_region_x needs to be decoded, V=width, and then log V=log (width). When height_minus1_minus_scan_region_y needs to be decoded, V=height, and then log V=log(height). If the coding block is a chroma block, the shift is determined according to the formula shift_x=clip3 (0,2, (T>>3)), where shift_x is the shift and T is the size of the coding block, and when width_minus1_minus_scan_region_x needs to be decoded, T=width. When height_minus1_minus_scan_region_y needs to be decoded, T=height.

Step S930: Set the context index increment corresponding to the binary symbol according to the initial value, the index number, and the shift.

In an embodiment of this disclosure, if binIdx is equal to 0, then ctxIdxInc maintains the current value, that is, ctxIdxInc=ctxIdxInc. If binIdx is greater than 0, a previous bin is 1, and binIdx is less than group_idx[min(T,32)−1], then ctxIdxInc=ctxIdxInc+(binIdx>>shift_x).

Figure 10:
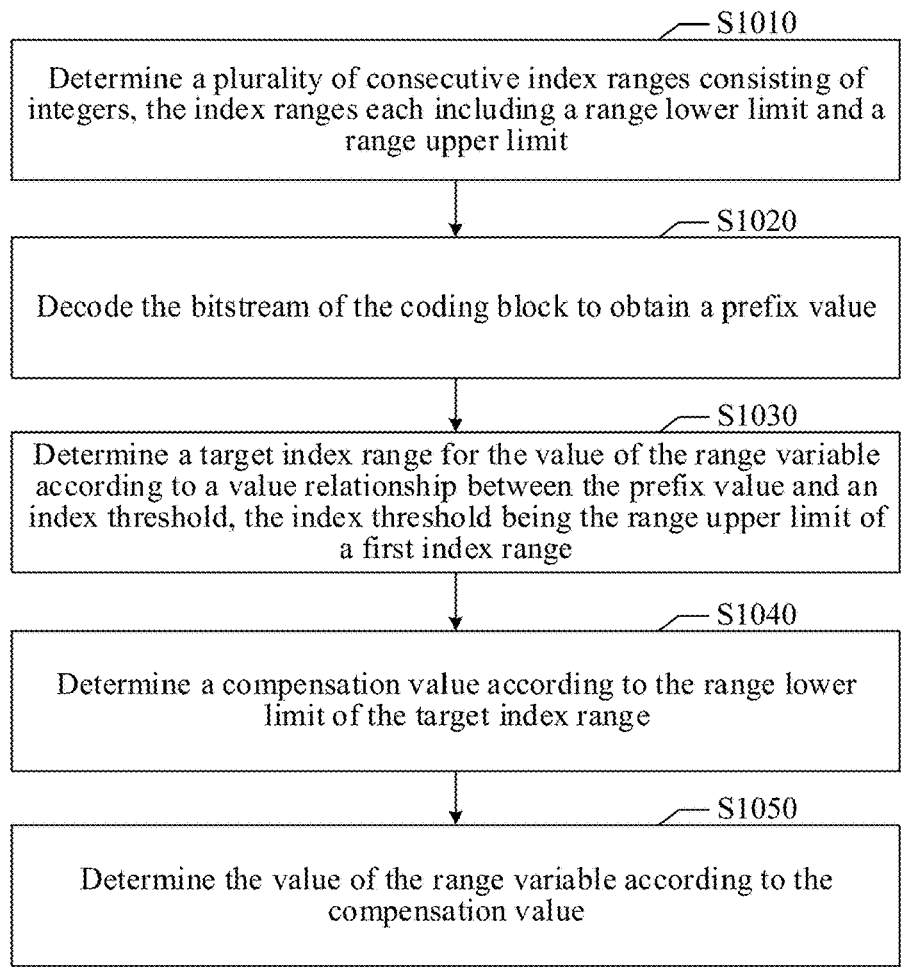
FIG. 10 is a flowchart of a step of decoding a range variable based on an index range according to an embodiment of this disclosure.

FIG. 10 is a flowchart of a step of decoding a range variable based on an index range according to an embodiment of this disclosure. As shown in FIG. 10, based on the above embodiments, the step S620 of decoding a bitstream of the coding block to obtain a value of a range variable associated with a scan region-based coefficient coding (SRCC) scan region of the coding block may include the following step S1010 to step S1050.

Step S1010: Determine a plurality of consecutive index ranges consisting of integers, the index ranges each including a range lower limit and a range upper limit.

In this embodiment of this disclosure, a series of ranges with values being integers are first determined, which are recorded as R0, R1, R2, . . . , and Rn, where the index of Rx is x, and a range Rx can be expressed as [Rx_start, Rx_end].

Table 2 shows an index range division method according to an embodiment of this disclosure.

TABLE 2

| Range Rx | Range division |
|---|---|
| | Range scope [Rx_start, Rx_end] |
| $R_0$ | [0, $R_0$_end]) |
| $R_1$ | [$R_0$_end, $R_1$_end) |
| $R_2$ | [$R_1$_end, $R_2$_end) |
| $R_3$ | [$R_2$_end, $R_3$_end) |
| . . . | . . . |
| $R_x$ | [$R_{x-1}$_end, $R_x$_end) |
| . . . | . . . |
| $R_{n-1}$ | [$R_{n-2}$_end, $R_{n-1}$_end) |
| $R_n$ | [$R_{n-1}$_end, $R_n$_end) |

For example, values of relevant index ranges may be expressed as: $R_0$=[0, 5), $R_1$=[5, 9), $R_2$=[9, 17), and $R_3$=[17, MAX_TU_SIZE), MAX_TU_SIZE is the maximum size of the transform unit TU specified by a codec.

Step S1020: Decode the bitstream of the coding block to obtain a prefix value.

In an embodiment of this disclosure, a truncated value may be determined according to a number of intervals and the range lower limit of a last index range; and entropy decoding and inverse binarization are then performed in the bitstream of the coding block based on the truncated value through truncated unary code (see Table 3 below) to obtain the prefix value. The truncated value may be set to maxVal=$R_0$_end+n−1.

In an embodiment of this disclosure, the bitstream of the coding block may also be decoded through CABAC decoding to obtain the prefix value, where each binary bit has a corresponding context model.

Step S1030: Determine a target index range for the value of the range variable according to a value relationship between the prefix value and an index threshold, the index threshold being the range upper limit of a first index range.

For example, an upper limit $R_0$_end of the first index range is taken as the index threshold, if pre is equal to $R_0$_end+x−1(x=1~n−1), it can be determined that the value of the range variable belongs to a range $R_x$=[$R_{x-1}$_end, $R_x$_end).

Step S1040: Determine a compensation value according to the range lower limit of the target index range.

Step S1050: Determine the value of the range variable according to the compensation value.

In an embodiment of this disclosure, the range variable is set to the compensation value in response to the target index range being the first index range; and the bitstream of the coding block is decoded to obtain a suffix value and the range variable is set to a sum of the compensation value and the suffix value, in response to the target index range being an index range other than the first index range.

For example, if pre is less than or equal to $R_0$_end−1, the compensation value may be offset=pre. If pre is equal to $R_0$_end+x−1 (x=1~n−1), then the value of width_minus1_minus_scan_region_x or height_minus1_minus_scan_region_y to be decoded belongs to a range $R_x$=[$R_{x-1}$_end, $R_x$_end). On this basis, the offset may be equal to $R_{x-1}$_end.

In an embodiment of this disclosure, the method for decoding the bitstream of the coding block to obtain a suffix value may include: determining a target number of binary symbols to be decoded in the bitstream of the coding block according to the range upper limit and the range lower limit of the target index range; entropy decoding the target number of binary symbols in the bitstream of the coding block; and determining the target number as a length len of a fixed-length code, and performing inverse binarization on a result of the entropy decoding based on a fixed-length code of len bits to obtain the suffix value.

For example, in this embodiment of this disclosure, the target number of binary symbols to be decoded may be recorded as len=Ceil (log 2($R_{x\_end}-R_{x-1\_end}$)). If the suffix suf is deducted according to a manner of len-bit fixed-length code and through inverse binarization (see Table 1 above), then the value of width_minus1_minus_scan_region_x or height_minus1_minus_scan_region_y to be decoded is offset+suf.

In an embodiment of this disclosure, the method for decoding the bitstream of the coding block to obtain a suffix value may include: selecting a target decoding method from a plurality of candidate decoding methods; and decoding the bitstream of the coding block according to the target decoding method to obtain the suffix value.

In an embodiment of this disclosure, the plurality of candidate decoding methods that can be selected may include: a decoding method based on truncated unary code (truncated value maxVal=Rx_end-offset-1) (see Table 3 below); a decoding method based on unary code (see Table 4 below); a decoding method based on a fixed-length code of len bits (see Table 1 above); and a decoding method based on a k-order exponential Golomb code (see Table 5 below).

Table 3 Relationship Between SynElVal and Binary Symbol Strings (Two Forms of Truncated Unary Code: Table 3-1 or Table 3-2)

TABLE 3-1

| SynElVal | Binary symbol string | | | | | | |
|---|---|---|---|---|---|---|---|
| 0 | 1 | | | | | | |
| 1 | 0 | 1 | | | | | |
| 2 | 0 | 0 | 1 | | | | |
| 3 | 0 | 0 | 0 | 1 | | | |
| 4 | 0 | 0 | 0 | 0 | 1 | | |
| 5 | 0 | 0 | 0 | 0 | 0 | 1 | |
| ... | 0 | 0 | 0 | 0 | 0 | 0 | ... |
| maxVal-1 | 0 | 0 | 0 | 0 | 0 | 0 | ... | 1 |
| maxVal | 0 | 0 | 0 | 0 | 0 | 0 | ... | 0 |
| binIdx | 0 | 1 | 2 | 3 | 4 | 5 | ... | maxVal-1 |

TABLE 3-2

| SynElVal | Binary symbol string | | | | | | |
|---|---|---|---|---|---|---|---|
| 0 | 0 | | | | | | |
| 1 | 1 | 0 | | | | | |
| 2 | 1 | 1 | 0 | | | | |
| 3 | 1 | 1 | 1 | 0 | | | |
| 4 | 1 | 1 | 1 | 1 | 0 | | |
| 5 | 1 | 1 | 1 | 1 | 1 | 0 | |
| ... | 1 | 1 | 1 | 1 | 1 | 1 | ... |
| maxVal-1 | 1 | 1 | 1 | 1 | 1 | 1 | ... | 0 |
| maxVal | 1 | 1 | 1 | 1 | 1 | 1 | ... | 1 |
| binIdx | 0 | 1 | 2 | 3 | 4 | 5 | ... | maxVal-1 |

Table 4 Relationship Between SynElVal and Binary Symbol Strings (Including Two Unary Code Forms: Table 4-1 or Table 4-2)

TABLE 4-1

| SynElVal | Binary symbol string | | | | | |
|---|---|---|---|---|---|---|
| 0 | 1 | | | | | |
| 1 | 0 | 1 | | | | |
| 2 | 0 | 0 | 1 | | | |
| 3 | 0 | 0 | 0 | 1 | | |
| 4 | 0 | 0 | 0 | 0 | 1 | |
| 5 | 0 | 0 | 0 | 0 | 0 | 1 |
| ... | | | | | | |
| binIdx | 0 | 1 | 2 | 3 | 4 | 5 |

TABLE 5-2

| SynElVal | Binary symbol string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ... | | | | | | |
| binIdx | 0 | 1 | 2 | 3 | 4 | 5 |

TABLE 5

K-order exponential Golomb code table

| Order | Code word structure | CodeNum value range |
|---|---|---|
| k = 0 | 1 | 0 |
| | 0 1 $x_0$ | 1~2 |
| | 0 0 1 $x_1$ $x_0$ | 3~6 |
| | 0 0 0 1 $x_2$ $x_1$ $x_0$ | 7~14 |
| | ... | ... |
| k = 1 | 1 $x_0$ | 0~1 |
| | 0 1 $x_1$ $x_0$ | 2~5 |
| | 0 0 1 $x_2$ $x_1$ $x_0$ | 6~13 |
| | 0 0 0 1 $x_3$ $x_2$ $x_1$ $x_0$ | 14~29 |
| | ... | ... |
| k = 2 | 1 $x_1$ $x_0$ | 0~3 |
| | 0 1 $x_2$ $x_1$ $x_0$ | 4~11 |
| | 0 0 1 $x_3$ $x_2$ $x_1$ $x_0$ | 12~27 |
| | 0 0 0 1 $x_4$ $x_3$ $x_2$ $x_1$ $x_0$ | 28~59 |
| | ... | ... |
| k = 3 | 1 $x_2$ $x_1$ $x_0$ | 0~7 |
| | 0 1 $x_3$ $x_2$ $x_1$ $x_0$ | 8~23 |
| | 0 0 1 $x_4$ $x_3$ $x_2$ $x_1$ $x_0$ | 24~55 |
| | 0 0 0 1 $x_5$ $x_4$ $x_3$ $x_2$ $x_1$ $x_0$ | 56~119 |
| | ... | ... |

The index ranges $R_0$=[0, 5), $R_1$=[5, 9), $R_2$=[9, 17), and $R_3$=[17, max_TU_size], that is, n=3, x=0~3, and $R_0$_end=5 are used as examples for description below, where MAX_TU_SIZE is the maximum size of TU specified by the codec.

(1) A series of ranges with values being integers are first determined, $R_0$=[0, 5), R1=[5, 9), $R_2$=[9, 17), and $R_3$=[17, MAX_TU_SIZE];

(2) The prefix value pre is decoded and inversely binarized from the bitstream according to truncated unary code (see Table 3, truncated value maxVal=5+3−1=7) If pre is less than or equal to 4, offset=pre, and then the value of width_minus1_minus_scan_region_x or height_minus1_minus_scan_region_y to be decoded is offset.

(3) The pre uses CABAC for entropy decoding, and each binary bit has a corresponding context model.

(4) If pre is equal to 5 (x=1), then the value of width_minus1_minus_scan_region_x or height_minus1_minus_scan_region_y to be decoded belongs to a range $R_1$=[5, 9). The offset is equal to 5, a 2-bit bit is entropy decoded from the bitstream, the suffix value suf is deducted and inversely binarized (see Table 1) based on a 2-bit fixed-length code, and then the value of width_minus1_minus_scan_region_x or height_minus1_minus_scan_region_y to be decoded is off-set+suf.

(5) For the step (4) above, the suffix value suf may also be entropy decoded and inversely binarized, thus obtaining the value according to one of the following methods, including but not limited to:

(5-1) performing inverse binarization on the suffix value based on k-order exponential Golomb code (see Table 5);

(5-2) performing inverse binarization on the suffix value suf according to truncated unary code (see Table 3, truncated value maxVal=$R_x$_end-offset-1=9−5−1=3); and (5-3) performing inverse binarization on the suffix value suf based on unary code (see Table 4).

(6) If pre is equal to 6(x=2), then the value of width_minus1_minus_scan_region_x or height_minus1_minus_scan_region_y to be decoded belongs to a range $R_2$=[9, 17), the offset is equal to 9, a 3-bit bit is entropy decoded from the bitstream, the suffix value suf is deducted and inversely binarized (see Table 1) based on a 3-bit fixed-length code, and then the value of width_minus1_minus_scan_region_x or height_minus1_minus_scan_region_y to be decoded is off-set+suf.

(7) For the step (6) above, the suffix value suf may also be entropy decoded and inversely binarized, thus obtaining the value according to one of the following methods, including but not limited to:

(7-1) performing inverse binarization on the suffix value based on k-order exponential Golomb code (see Table 5);

(7-2) performing inverse binarization on the suffix value suf according to truncated unary code (see Table 3, truncated value maxVal=_end-offset-1=17−9−1=7); and (7-3) performing inverse binarization on the suffix value suf based on unary code (see Table 4).

(8) If pre is equal to 7, then the value of width_minus1_minus_scan_region_x or height_minus1_minus_scan_region_y to be decoded belongs to a range $R_3$=[17, MAX_TU_SIZE), the offset is equal to 17, entropy decoding continues to be performed from the bitstream, and the suffix value suf is inversely binarized (see Table 5) and deducted based on k-order exponential Golomb code. Then, the value of width_minus1_minus_scan_region_x or height_minus1_minus_scan_region_y to be decoded is off-set+suf.

(9) For (8) above, the suffix value suf may also be entropy decoded and inversely binarized, thus obtaining the value according to one of the following methods, including but not limited to:

(9-1) performing inverse binarization (see Table 1) based on len=Ceil(log 2($R_n$_end-$R_{n-1}$_end))-bit fixed-length code and obtaining the suffix value suf through deduction;

(9-2) performing inverse binarization on the suffix value suf based on truncated unary code (see Table 3); and (9-3) performing inverse binarization on the suffix value suf based on unary code (see Table 4);

In an embodiment of this disclosure, the method for decoding a bitstream of the coding block to obtain a value of a range variable associated with a scan region-based coefficient coding (SRCC) scan region may include: selecting a target decoding method from a plurality of candidate decoding methods; and decoding the bitstream of the coding block according to the target decoding method to obtain the value of the range variable associated with the SRCC scan region. In an embodiment of this disclosure, the plurality of candidate decoding methods that can be selected may include: a decoding method based on truncated unary code (see Table 3 above); a decoding method based on unary code (see Table 4 above); a decoding method based on a fixed-length code of len bits (see Table 1 above); and a decoding method based on a k-order exponential Golomb code (see Table 5 above).

Figure 11:
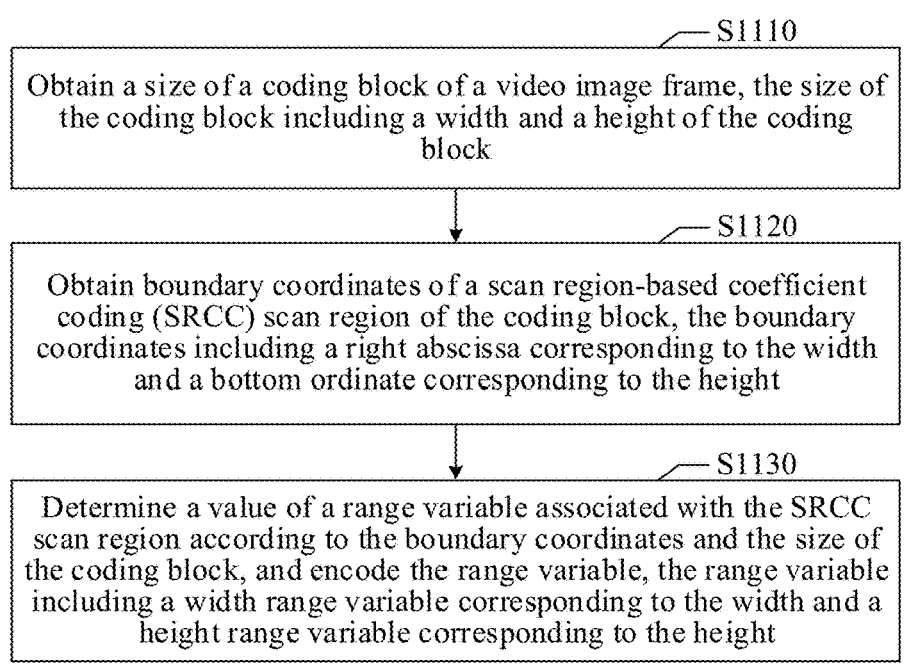
FIG. 11 is a flowchart of steps of a video encoding method according to an embodiment of this disclosure.

In the above embodiments, the decoding solution related to boundary coefficients of an SRCC scan region is described from the perspective of the decoder side. Encoding solution corresponding to the above embodiments may be used at the encoder side. FIG. 11 is a flowchart of steps of a video encoding method according to an embodiment of this disclosure. The video coding method may be performed by a device having a computing processing function, for example, may be performed by a terminal device or a server, or may be performed by an electronic device shown in FIG. 14. As shown in FIG. 11, the video encoding method may mainly include the following steps S1110 to S1130.

Step S1110: Obtain a size of a coding block of a video image frame, the size of the coding block including a width and a height of the coding block.

Step S1120: Obtain boundary coordinates of a scan region-based coefficient coding (SRCC) scan region of the coding block, the boundary coordinates including a right abscissa corresponding to the width and a bottom ordinate corresponding to the height.

Step S1130: Determine a value of a range variable associated with the SRCC scan region according to a difference between the size of the coding block and the boundary coordinates, and encode the range variable, the range variable including a width range variable corresponding to the width and a height range variable corresponding to the height.

The relevant content details of the video encoding method in the embodiments of this disclosure correspond to the video decoding method in the above embodiments, and will not be repeated here.

Based on the above embodiments, in this disclosure, according to statistical characteristics of boundary coordinates of an SRCC scan region, a method for encoding and decoding boundary coordinates of an SRCC scan region is provided. That is, a right abscissa and a bottom ordinate of the SRCC scan region are not directly encoded, but range variables related to the boundary coordinates and a size of a coding block are encoded. During decoding, a value of a range variable is first decoded and deducted from a bitstream, and then the boundary coordinates of the SRCC scan region can be obtained. The encoding and decoding methods provided in the embodiments of this disclosure can reduce the number of bits required for encoding, and help improve the encoding and decoding efficiency of coefficient encoding, thereby further improving the video compression performance.

Although the steps of the method in this disclosure are described in a specific order in the accompanying drawings, this does not require or imply that the steps have to be performed in the specific order, or all the steps shown have to be performed to achieve an expected result. Additionally or alternatively, some steps may be omitted, a plurality of steps may be combined into one step, and/or one step may be decomposed into a plurality of steps for execution, and the like.

Figure 12:
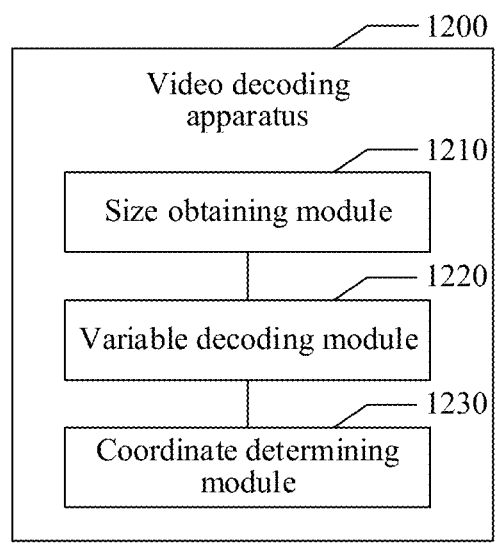
FIG. 12 is a structural block diagram of a video decoding apparatus according to an embodiment of this disclosure.

The following describes the apparatus embodiments of this disclosure, which may be configured to perform the video encoding method and the video decoding method in the foregoing embodiments of this disclosure. FIG. 12 is a structural block diagram of a video decoding apparatus according to an embodiment of this disclosure. As shown in FIG. 12, the video decoding apparatus 1200 may mainly include: a size obtaining module 1210, configured to obtain a size of a coding block of a video image frame, the size of the coding block including a width and a height of the coding block; a variable decoding module 1220, configured to decode a bitstream of the coding block to obtain a value of a range variable associated with a scan region-based coefficient coding (SRCC) scan region of the coding block, the range variable including a width range variable corresponding to the width and a height range variable corresponding to the height; and a coordinate determining module 1230, configured to determine boundary coordinates of the SRCC scan region according to a difference between the size of the coding block and the range variable, the boundary coordinates including a right abscissa corresponding to the width range variable and a bottom ordinate corresponding to the height range variable.

In some embodiments of this disclosure, based on the above embodiments, the coordinate determining module is configured to: determine the boundary coordinates of the SRCC scan region according to the following formula:

SRx=width-1-width_minus1_minus_scan_region_x,

SRy=height-1-height_minus1_minus_scan_region_y, where SRx represents the right abscissa, SRy represents the bottom ordinate, width represents the width, height represents the height, width_minus1_minus_scan_region_x represents the width range variable, and height_minus1_minus_scan_region_y represents the height range variable.

In some embodiments of this disclosure, based on the above embodiments, the variable decoding module 1220 includes: a binary symbol decoding unit, configured to sequentially decode binary symbols corresponding to index numbers in ascending order of the index numbers in the bitstream of the coding block to obtain values of the binary symbol; a position variable setting unit, configured to, in response to a value of a current binary symbol being a preset first value, set a position variable to a current index number corresponding to the current binary symbol; and a range variable setting unit, configured to set the range variable associated with the SRCC scan region of the coding block according to a value of the position variable.

In some embodiments of this disclosure, based on the above embodiments, the range variable setting unit includes: a value comparison subunit, configured to compare the value of the position variable with a preset second value; a first setting subunit, configured to set the range variable to the second value in response to the value of the position variable being less than or equal to the second value; a value determining subunit, configured to determine a prefix value according to the value of the position variable and determine a suffix value according to a decoding result of other binary symbols after the current binary symbol, in response to the value of the position variable being greater than the second value, and a second setting subunit, configured to set the range variable to a sum of the prefix value and the suffix value.

In some embodiments of this disclosure, based on the above embodiments, the value determining subunit is further configured to: perform mapping processing on the value of the position variable according to a first mapping vector to obtain a first mapping value corresponding to the value of the position variable; and determine the prefix value according to the first mapping value.

In some embodiments of this disclosure, based on the above embodiments, the value determining subunit is further configured to: determine a target number of other binary symbols to be decoded according to the value of the position variable; and decode the target number of other binary symbols after the current binary symbol to obtain the suffix value.

In some embodiments of this disclosure, based on the above embodiments, the value determining subunit is further configured to: entropy decode the target number of other binary symbols after the current binary symbol based on a bypass decoding manner; and determine the target number as a length len of a fixed-length code, and perform inverse binarization on a result of the entropy decoding based on a fixed-length code of len bits to obtain the suffix value.

In some embodiments of this disclosure, based on the above embodiments, the binary symbol decoding unit includes: an increment setting subunit, configured to set a context index increment corresponding to the binary symbol; a model determining subunit, configured to determine a context model corresponding to the binary symbol according to the set context index increment; and a value decoding subunit, configured to arithmetically decode the binary symbol based on the context model through a context adaptive binary arithmetic coding (CABAC) decoding engine to obtain the value of the binary symbol.

In some embodiments of this disclosure, based on the above embodiments, the increment setting subunit is configured to: set the context index increment to the index number corresponding to the binary symbol.

In some embodiments of this disclosure, based on the above embodiments, the increment setting subunit is configured to: set an initial value of the context index increment according to channel information of the coding block; determine a shift according to the channel information of the coding block and the size of the coding block; and set the context index increment corresponding to the binary symbol according to the initial value, the index number, and the shift.

In some embodiments of this disclosure, based on the above embodiments, the increment setting subunit is further configured to: set the initial value of the context index increment to a preset third value in response to the coding block being a luma block; and determine a fourth value related to the size of the coding block and increase the third value by the fourth value to obtain the initial value of the context index increment, in response to the coding block being a chroma block.

In some embodiments of this disclosure, based on the above embodiments, the increment setting subunit is further configured to: perform mapping processing on the size of the coding block according to a second mapping vector to obtain a second mapping value corresponding to the size of the coding block; and determine the second mapping value as the fourth value related to the size of the coding block.

In some embodiments of this disclosure, based on the above embodiments, the increment setting subunit is further configured to: determine the shift according to a formula shift_x=clip3(0,2,(log V+1)>>2) in response to the coding block being a luma block, where shift_x represents the shift, and V represents the size of the coding block; and determine the shift according to a formula shift_x=clip3(0,2,(T>>3)) in response to the coding block being a chroma block, where shift_x represents the shift, and T represents the size of the coding block.

In some embodiments of this disclosure, based on the above embodiments, the variable decoding module 1120 includes: an index range determining unit, configured to determine a plurality of consecutive index ranges consisting of integers, the index ranges each including a range lower limit and a range upper limit; a prefix value decoding unit, configured to decode the bitstream of the coding block to obtain a prefix value; a target range determining unit, configured to determine a target index range for the value of the range variable according to a value relationship between the prefix value and an index threshold, the index threshold being the range upper limit of a first index range; a compensation value determining unit, configured to determine a compensation value according to the range lower limit of the target index range; and a range variable determining unit, configured to determine the value of the range variable according to the compensation value.

In some embodiments of this disclosure, based on the above embodiments, the prefix value decoding unit includes: a truncated value determining subunit, configured to determine a truncated value according to a number of intervals and the range lower limit of a last index range; and a prefix value decoding subunit, configured to perform entropy decoding and inverse binarization in the bitstream of the coding block based on the truncated value through truncated unary code to obtain the prefix value.

In some embodiments of this disclosure, based on the above embodiments, the prefix value decoding unit is configured to: decode the bitstream of the coding block through CABAC decoding to obtain the prefix value.

In some embodiments of this disclosure, based on the above embodiments, the range variable determining unit includes: a first variable setting subunit, configured to set the range variable to the compensation value in response to the target index range being the first index range; and a second variable setting subunit, configured to decode the bitstream of the coding block to obtain a suffix value and set the range variable to a sum of the compensation value and the suffix value, in response to the target index range being an index range other than the first index range.

In some embodiments of this disclosure, based on the above embodiments, the second variable setting subunit is further configured to: determine a target number of binary symbols to be decoded in the bitstream of the coding block according to the range upper limit and the range lower limit of the target index range; entropy decode the target number of binary symbols in the bitstream of the coding block; and determine the target number as a length len of a fixed-length code, and perform inverse binarization on a result of the entropy decoding based on a fixed-length code of len bits to obtain the suffix value.

In some embodiments of this disclosure, based on the above embodiments, the second variable setting subunit is further configured to: select a target decoding method from a plurality of candidate decoding methods; and decode the bitstream of the coding block according to the target decoding method to obtain the suffix value.

In some embodiments of this disclosure, based on the above embodiments, the variable decoding module 1220 includes: a decoding method selection unit, configured to select a target decoding method from a plurality of candidate decoding methods; and a target method decoding unit, configured to decode the bitstream of the coding block according to the target decoding method to obtain the value of the range variable associated with the SRCC scan region.

In some embodiments of this disclosure, based on the above embodiments, the plurality of candidate decoding methods include at least one of following decoding methods: a decoding method based on truncated unary code; a decoding method based on unary code; a decoding method based on a fixed-length code of len bits; and a decoding method based on a k-order exponential Golomb code.

In some embodiments of this disclosure, based on the above embodiments, the video decoding apparatus 1200 is applied to a coding block satisfying any one of the following conditions: a coding block in a transform skip mode; a coding block with a picture-level intra prediction transform skip enable flag value of 1; a coding block with a picture-level inter prediction transform skip enable flag value of 1; a coding block with a picture-level intra prediction transform skip enable flag value of 1 and a picture-level inter prediction transform skip enable flag value of 1; and all coding blocks.

Figure 13:
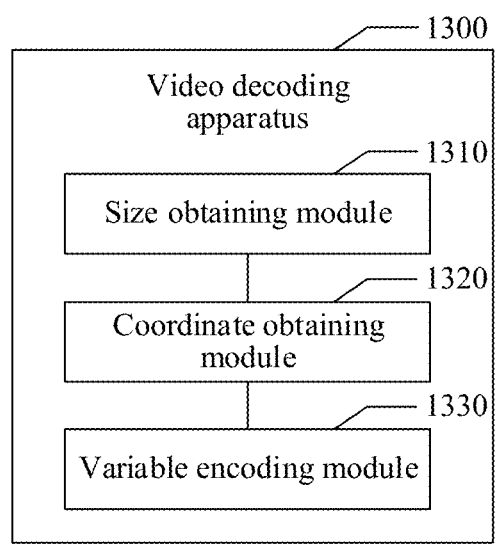
FIG. 13 is a structural block diagram of a video encoding apparatus according to an embodiment of this disclosure.

FIG. 13 is a structural block diagram of a video encoding apparatus according to an embodiment of this disclosure. As shown in FIG. 13, the video encoding apparatus 1300 may mainly include: a size obtaining module 1310, configured to obtain a size of a coding block of a video image frame, the size of the coding block including a width and a height of the coding block; a coordinate obtaining module 1320, configured to obtain boundary coordinates of a scan region-based coefficient coding (SRCC) scan region of the coding block, the boundary coordinates including a right abscissa corresponding to the width and a bottom ordinate corresponding to the height; and a variable encoding module 1330, configured to determine a value of a range variable associated with the SRCC scan region according to a difference between the size of the coding block and the boundary coordinates, and encode the range variable, the range variable including a width range variable corresponding to the width and a height range variable corresponding to the height.

Details of the video decoding apparatus provided in the embodiments of this disclosure have been described in detail in the corresponding method embodiments, and will not be repeated here.

In the technical solutions provided in the embodiments of this disclosure, according to statistical characteristics of boundary coordinates of an SRCC scan region, a method for encoding and decoding boundary coordinates of an SRCC scan region is provided. That is, a right abscissa and a bottom ordinate of the SRCC scan region are not directly encoded, but range variables related to the boundary coordinates and a size of a coding block are encoded. During decoding, a value of a range variable is first decoded and deducted from a bitstream, and then the boundary coordinates of the SRCC scan region can be obtained. The encoding and decoding methods provided in the embodiments of this disclosure can reduce the number of bits required for encoding, and help improve the encoding and decoding efficiency of coefficient encoding, thereby further improving the video compression performance.

Figure 14:
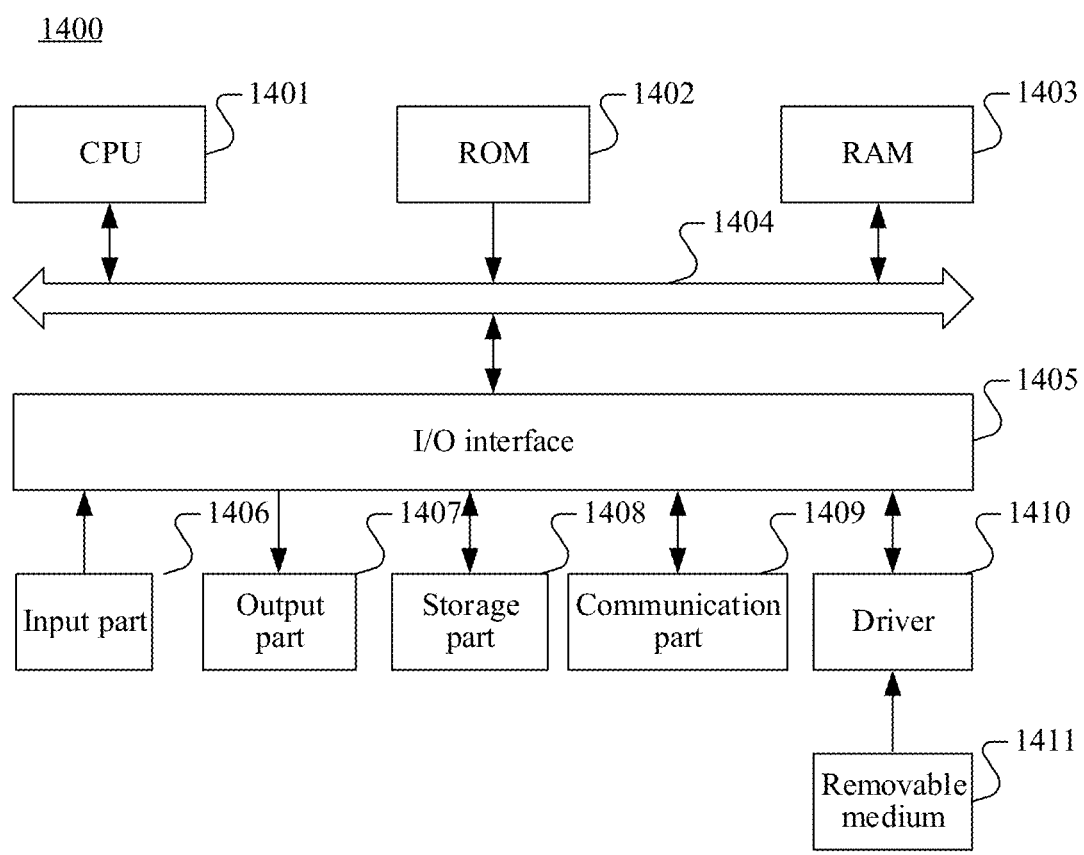
FIG. 14 is a structural block diagram of a computer system of an electronic device adapted to implement an embodiment of this disclosure.

FIG. 14 is a structural block diagram of a computer system of an electronic device adapted to implement an embodiment of this disclosure.

A computer system 1400 of the electronic device shown in FIG. 14 is merely an example, and does not constitute any limitation on functions and use ranges of the embodiments of this disclosure.

As shown in FIG. 14, the computer system 1400 includes a central processing unit (CPU) 1401 (including processing circuitry). The CPU 1401 may perform various appropriate actions and processing according to a program stored in a read-only memory (ROM) 1402 or a program loaded from a storage part 1408 into a random access memory (RAM) 1403 (including a non-transitory computer-readable storage medium storing computer-readable instructions). The random access memory 1403 further stores various programs and data required for system operations. The central processing unit 1401, the read-only memory 1402, and the random access memory 1403 are connected to each other via a bus 1404. An input/output (I/O) interface 1405 is also connected to the bus 1404.

The following components are connected to the input/output interface 1405: an input part 1406 including a keyboard and a mouse, etc.; an output part 1407 including a cathode ray tube (CRT), a liquid crystal display (LCD), a speaker, or the like; a storage part 1408 including hard disk, etc.; and a communication part 1409 including a network interface card such as a local area network card or a modem, etc. The communication part 1409 performs communication processing by using a network such as the Internet. A drive 1410 is also connected to the input/output interface 1405 as required. A removable medium 1411, such as a disk, an optical disc, a magneto-optical disc, or a semiconductor memory, is installed on the drive 1410 as required, so that a computer program read from the removable medium 1411 is installed in the storage part 1408 as required.

Particularly, according to the embodiments of this disclosure, the processes described in the method flowcharts may be implemented as computer software programs. For example, the embodiments of this disclosure include a computer program product, the computer program product including a computer program carried on a computer-readable medium, the computer program including a program code configured to perform the methods shown in the flowcharts. In such an embodiment, the computer program may be downloaded and installed from a network through the communication part 1409, and/or installed from the removable medium 1411. When the computer program is executed by the central processing unit 1401, the various functions defined in the system of this disclosure are executed.

The computer-readable medium shown in the embodiments of this disclosure may be a computer-readable signal medium or a computer-readable storage medium or any combination of two. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this disclosure, the computer-readable storage medium may be any tangible medium containing or storing a program, and the program may be used by or used in combination with an instruction execution system, apparatus, or device. In this disclosure, the computer-readable signal medium may include a data signal being in a baseband or transmitted as a part of a carrier, which carries computer-readable program code. A data signal propagated in such a way may assume a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may send, propagate or transmit a program that is used by or used in combination with an instruction execution system, apparatus or device. The program code included in the readable storage medium may be transmitted using any suitable medium, including but not limited to: a wireless medium, a wire medium, or the like, or any suitable combination thereof.

The flowcharts and block diagrams in the accompanying drawings illustrate possible system architectures, functions, and operations that may be implemented by a system, a method, and a computer program product according to various embodiments of this disclosure. In this regard, each box in the flowchart or the block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

Although a plurality of modules or units of a device configured to perform actions are discussed in the foregoing detailed description, such division is not mandatory. Actually, according to the implementations of this disclosure, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the implementations of this disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of this disclosure.

Other embodiments of this disclosure will be apparent to a person skilled in the art from consideration of the specification and practice of the disclosure here. This disclosure is intended to cover any variations, uses, or adaptive changes of this disclosure following the general principles of this disclosure, and includes well-known knowledge and conventional technical means in the art and undisclosed in this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A video decoding method, comprising:
   obtaining a size of a coding block of a video image frame, the size of the coding block comprising a width and a height of the coding block;
   decoding a bitstream of the coding block to obtain a value of a range variable associated with a scan region-based coefficient coding (SRCC) scan region of the coding block, the range variable comprising a width range variable corresponding to a width of the SRCC scan region and a height range variable corresponding to a height of the SRCC scan region, wherein each of the width range variable and the height range variable are obtained by comparing a prefix value of the width range variable and a prefix value of the height range variable respectively to one or more predefined value intervals; and
   determining a horizontal coordinate of boundary coordinates of the SRCC scan region according to a difference between the width of the coding block and the width range variable and determining a vertical coordinate of the boundary coordinates of the SRCC scan region according to a difference between the height of the coding block and the height range variable, wherein the decoding comprises one of:
   (i) sequentially decoding a binary symbol corresponding to index numbers in an ascending order of the index numbers in the bitstream of the coding block to obtain a value of the binary symbol, setting a position variable to a current index number corresponding to the binary symbol in response to the value of the binary symbol being a preset first value, and setting one of the width range variable or the height range variable associated with the SRCC scan region of the coding block according to a value of the position variable; and
   (ii) determining the one or more predefined value intervals, the value intervals each comprising an interval lower limit and an interval upper limit, decoding the bitstream of the coding block to obtain the prefix value of one of the width range variable or the height range variable, determining one of the one or more predefined value intervals corresponding to the one of the width range variable or the height range variable according to a comparison of the prefix value of the one of the width range variable or the height range variable and an interval upper limit of a first value interval, determining a compensation value according to an interval lower limit of the one of the one or more predefined value intervals, and determining the value of the one of the width range variable or the height range variable according to the compensation value.

2. The video decoding method according to claim 1, wherein the determining comprises:
   determining the horizontal coordinate and the vertical coordinate of the boundary coordinates of the SRCC scan region according to a following formula:

SRx=width-1-width_minus1_minus_scan_region_x,

SRy=height-1-height_minus1_minus_scan_region_y, wherein SRx represents the horizontal coordinate, SRy represents the vertical coordinate, width represents the width of the coding block, height represents the height of the coding block, width_minus1_minus_scan_region_x represents the width range variable, and height_minus1_minus_scan_region_y represents the height range variable.

3. The video decoding method according to claim 1, wherein the decoding comprises:
   sequentially decoding the binary symbol corresponding to the index numbers in the ascending order of the index numbers in the bitstream of the coding block to obtain the value of the binary symbol;
   in response to the value of the binary symbol being the preset first value, setting the position variable to the current index number corresponding to the binary symbol; and
   setting the one of the width range variable or the height range variable associated with the SRCC scan region of the coding block according to the value of the position variable.

4. The video decoding method according to claim 3, wherein the setting the one of the width range variable or the height range variable comprises:
   comparing the value of the position variable with a preset second value defining one of the one or more predefined value intervals;
   setting the one of the width range variable or the height range variable to the preset second value in response to the value of the position variable being less than or equal to the preset second value; and
   in response to the value of the position variable being greater than the preset second value, determining the prefix value of the one of the width range variable or the height range variable according to the value of the position variable and determining a suffix value by decoding other binary symbols after the binary symbol associated with the position variable, and setting the one of the width range variable or the height range variable to a sum of the prefix value and the suffix value.

5. The video decoding method according to claim 4, wherein the determining the prefix value according to the value of the position variable comprises:
   performing mapping processing on the value of the position variable according to a first mapping vector to obtain a first mapping value corresponding to the value of the position variable; and
   determining the prefix value according to the first mapping value.

6. The video decoding method according to claim 4, wherein the determining the suffix value comprises:
  determining a number of the other binary symbols to be decoded according to the value of the position variable; and
  decoding the determined number of the other binary symbols after the binary symbol associated with the position variable to obtain the suffix value.

7. The video decoding method according to claim 6, wherein the decoding the determined number of the other binary symbols comprises:
  entropy decoding the determined number of the other binary symbols after the binary symbol associated with the position variable based on a bypass decoding manner; and
  determining the number as a length len of a fixed-length code, and performing inverse binarization on a result of the entropy decoding based on the fixed-length code of len bits to obtain the suffix value.

8. The video decoding method according to claim 3, wherein the sequentially decoding the binary symbol comprises:
  setting a context index increment corresponding to the binary symbol;
  determining a context model corresponding to the binary symbol according to the set context index increment; and
  arithmetically decoding the binary symbol based on the context model through a context adaptive binary arithmetic coding (CABAC) decoding engine to obtain the value of the binary symbol.

9. The video decoding method according to claim 8, wherein the setting the context index increment comprises:
  setting the context index increment to the current index number corresponding to the binary symbol.

10. The video decoding method according to claim 8, wherein the setting the context index increment comprises:
  setting an initial value of the context index increment according to channel information of the coding block;
  determining a shift according to the channel information of the coding block and the size of the coding block; and
  setting the context index increment corresponding to the binary symbol according to the initial value, the current index number, and the shift.

11. The video decoding method according to claim 10, wherein the setting the initial value comprises:
  setting the initial value of the context index increment to a preset third value in response to the coding block being a luma block; and
  determining a fourth value related to the size of the coding block and increasing the preset third value by the fourth value to obtain the initial value of the context index increment, in response to the coding block being a chroma block.

12. The video decoding method according to claim 11, wherein the determining the fourth value comprises:
  performing mapping processing on the size of the coding block according to a second mapping vector to obtain a second mapping value corresponding to the size of the coding block; and
  determining the second mapping value as the fourth value related to the size of the coding block.

13. The video decoding method according to claim 10, wherein the determining the shift comprises:
  determining the shift according to a formula shift_x=clip3 $(0, 2, (\log V+1)>>2)$ when the coding block is a luma block, wherein shift_x represents the shift, and V represents the size of the luma block; and
  determining the shift according to a formula shift_x=clip3 $(0, 2, (T>>3))$ when the coding block is a chroma block, wherein T represents the size of the chroma block.

14. The video decoding method according to claim 1, wherein the decoding comprises:
  determining the one or more predefined value intervals, the value intervals each comprising the interval lower limit and the interval upper limit;
  decoding the bitstream of the coding block to obtain the prefix value of the one of the width range variable or the height range variable;
  determining the one of the one or more predefined value intervals corresponding to the one of the width range variable or the height range variable according to the comparison of the prefix value of the one of the width range variable or the height range variable and an interval upper limit of a first value interval;
  determining the compensation value according to the interval lower limit of the one of the one or more predefined value intervals; and
  determining the value of the one of the width range variable or the height range variable according to the compensation value.

15. The video decoding method according to claim 14, wherein the decoding the bitstream of the coding block to obtain the prefix value comprises:
  determining a truncated value according to a number of the one or more predefined value intervals and an interval lower limit of a last value interval; and
  performing entropy decoding and inverse binarization in the bitstream of the coding block based on the truncated value through truncated unary code to obtain the prefix value of one of the width range variable or the height range variable.

16. The video decoding method according to claim 14, wherein the decoding the bitstream of the coding block to obtain the prefix value comprises:
  decoding the bitstream of the coding block through CABAC decoding to obtain the prefix value of the one of the width range variable or the height range variable.

17. The video decoding method according to claim 14, wherein the determining the value of the one of the width range variable or the height range variable comprises:
  setting the one of the width range variable or the height range variable to the compensation value in response to the determined one of the one or more predefined value intervals being the first value interval; and
  decoding the bitstream of the coding block to obtain a suffix value and setting the one of the width range variable or the height range variable to a sum of the compensation value and the suffix value, in response to the determined one of the one or more predefined value intervals being a value interval other than the first value interval.

18. The video decoding method according to claim 17, wherein the decoding the bitstream of the coding block to obtain the suffix value comprises:
  determining a number of other binary symbols to be decoded in the bitstream of the coding block according to an interval upper limit and an interval lower limit of the determined one of the one or more predefined value intervals;
  entropy decoding the number of other binary symbols in the bitstream of the coding block; and determining the number of the other binary symbols as a length len of a fixed-length code, and performing inverse binarization on a result of the entropy decoding based on the fixed-length code of len bits to obtain the suffix value.

19. A video decoding apparatus comprising:
processing circuitry configured to
    obtain a size of a coding block of a video image frame, the size of the coding block comprising a width and a height of the coding block;
    decode a bitstream of the coding block to obtain a value of a range variable associated with a scan region-based coefficient coding (SRCC) scan region of the coding block, the range variable comprising a width range variable corresponding to a width of the SRCC scan region and a height range variable corresponding to a height of the SRCC scan region, wherein each of the width range variable and the height range variable are obtained by comparing a prefix value of the width range variable and a prefix value of the height range variable respectively to one or more predefined value intervals; and
    determine a horizontal coordinate of boundary coordinates of the SRCC scan region according to a difference between the width of the coding block and the width range variable and determine a vertical coordinate of the boundary coordinates of the SRCC scan region according to a difference between the height of the coding block and the height range variable, wherein the bitstream is decoded by one of:
        (i) sequentially decoding a binary symbol corresponding to index numbers in an ascending order of the index numbers in the bitstream of the coding block to obtain a value of the binary symbol, setting a position variable to a current index number corresponding to the binary symbol in response to the value of the binary symbol being a preset first value, and setting one of the width range variable or the height range variable associated with the SRCC scan region of the coding block according to a value of the position variable; and
        (ii) determining the one or more predefined value intervals, the value intervals each comprising an interval lower limit and an interval upper limit, decoding the bitstream of the coding block to obtain the prefix value of one of the width range variable or the height range variable, determining one of the one or more predefined value intervals corresponding to the one of the width range variable or the height range variable according to a comparison of the prefix value of the one of the width range variable or the height range variable and an interval upper limit of a first value interval, determining a compensation value according to an interval lower limit of the one of the one or more predefined value intervals, and determining the value of the one of the width range variable or the height range variable according to the compensation value.

20. A non-transitory computer-readable storage medium storing computer-readable instructions thereon, which, when executed by a computer device, cause the computer device to perform a video decoding method comprising:
    obtaining a size of a coding block of a video image frame, the size of the coding block comprising a width and a height of the coding block;
    decoding a bitstream of the coding block to obtain a value of a range variable associated with a scan region-based coefficient coding (SRCC) scan region of the coding block, the range variable comprising a width range variable corresponding to a width of the SRCC scan region and a height range variable corresponding to a height of the SRCC scan region, wherein each of the width range variable and the height range variable are obtained by comparing a prefix value of the width range variable and a prefix value of the height range variable respectively to one or more predefined value intervals; and
    determining a horizontal coordinate of boundary coordinates of the SRCC scan region according to a difference between the width of the coding block and the width range variable and determining a vertical coordinate of the boundary coordinates of the SRCC scan region according to a difference between the height of the coding block and the height range variable, wherein the decoding comprises one of:
        (i) sequentially decoding a binary symbol corresponding to index numbers in an ascending order of the index numbers in the bitstream of the coding block to obtain a value of the binary symbol, setting a position variable to a current index number corresponding to the binary symbol in response to the value of the binary symbol being a preset first value, and setting one of the width range variable or the height range variable associated with the SRCC scan region of the coding block according to a value of the position variable; and
        (ii) determining the one or more predefined value intervals, the value intervals each comprising an interval lower limit and an interval upper limit, decoding the bitstream of the coding block to obtain the prefix value of one of the width range variable or the height range variable, determining one of the one or more predefined value intervals corresponding to the one of the width range variable or the height range variable according to a comparison of the prefix value of the one of the width range variable or the height range variable and an interval upper limit of a first value interval, determining a compensation value according to an interval lower limit of the one of the one or more predefined value intervals, and determining the value of the one of the width range variable or the height range variable according to the compensation value.

* * * * *